(12) United States Patent
Savard et al.

(10) Patent No.: US 11,320,623 B2
(45) Date of Patent: May 3, 2022

(54) CENTERING OF AN OPTICAL ELEMENT USING EDGE CONTACT MOUNTING

(71) Applicant: INSTITUT NATIONAL D'OPTIQUE, Quebec (CA)

(72) Inventors: Maxime Savard, Quebec (CA); Frédéric Lamontagne, Quebec (CA)

(73) Assignee: INSTITUT NATIONAL D'OPTIQUE, Quèbec (CA)

( * ) Notice: Subject to any disclaimer, the term of this patent is extended or adjusted under 35 U.S.C. 154(b) by 135 days.

(21) Appl. No.: 16/793,957

(22) Filed: Feb. 18, 2020

(65) Prior Publication Data

US 2020/0264402 A1 Aug. 20, 2020

Related U.S. Application Data

(60) Provisional application No. 62/960,845, filed on Jan. 14, 2020, provisional application No. 62/807,081, filed on Feb. 18, 2019.

(51) Int. Cl.
*G02B 7/02* (2021.01)

(52) U.S. Cl.
CPC .................................. *G02B 7/026* (2013.01)

(58) Field of Classification Search
CPC .................................................... G02B 7/026
See application file for complete search history.

(56) References Cited

U.S. PATENT DOCUMENTS 9,244,245 B2 * 1/2016 Lamontagne .......... G02B 7/026
2016/0252700 A1 9/2016 Lamontagne et al.

OTHER PUBLICATIONS

International Search Report issued for International Serial No. PCT/CA2020/050207 dated Apr. 30, 2020.
Karow, H. Fabrication Methods for Precision Optics, Wiley, New York, 1993. (p. 542).
Karow, H. Fabrication Methods for Precision Optics, Wiley, New York, 1993. (p. 519).
Understanding Optical Specifications, https://www.edmundoptics.com/knowledge-center/application-notes/optics/understanding-optical-specifications/, Edmund Optics Inc.
Paul Yoder Jr., "Mounting Optics in Optical Instruments", SPIE Press (2008).

* cited by examiner

*Primary Examiner* — Robert E. Tallman
(74) *Attorney, Agent, or Firm* — Dinsmore & Shohl LLP

(57) ABSTRACT

Optical assemblies are provided in which an optical element is centered in the cavity of a barrel. The optical element is secured between a seat in the cavity and a retaining ring. The retaining ring has ring threads complementary to the barrel threads. The retaining ring has an abutment surface engaging a peripheral mounting edge of the optical element along a circular edge contact line. In some embodiments, the abutment surface has a frustro-spherical profile having a radius of curvature selected in view of the thread angle to maintain a centering of the optical element even when the retaining ring is decentered in the cavity. In other variants, the abutment surface has a frustro-conical profile having an inclination angle with respect to the center axis of the cavity selected in view of the thread angle to maintain said centering.

22 Claims, 16 Drawing Sheets

CENTERING OF AN OPTICAL ELEMENT USING EDGE CONTACT MOUNTING

TECHNICAL FIELD

The present invention relates to opto-mechanical systems.

BACKGROUND

Optical elements or components are omnipresent in devices, systems or arrangements where light needs to be directed, expanded, focused, collimated or otherwise transformed or affected. Optical elements can for example be embodied by lenses, mirrors, Diffractive Optical Elements (DOE), assemblies thereof, or the like.

In a typical optical system, most or all optical elements usually need to be precisely positioned and aligned in order to properly perform their intended optical function. This positioning and alignment typically involve securing the optical element in a holder or mount of some sort. Proper alignment of an optical element with respect to the holder is a delicate operation that generally requires tight manufacturing tolerances and careful handling.

Barrels are well known types of mechanical holders for optical elements. Barrels typically define a cylindrical cavity in which one or more optical elements are mounted. By way of example, a lens is a type of optical element that is often mounted in barrels. A lens generally needs to be centered with a precision that can be of the order of a few micrometers. Opto-mechanical assemblies in which lenses are mounted and precisely centered are known in the art. Referring to FIG. 1 (PRIOR ART), there is shown a typical assembly 20 including a lens 22, a barrel 24 and a retaining ring 26. The lens 22 is mounted in the barrel 24 with the periphery of one of its surfaces S1 in contact with a lens seat 28. The retaining ring 26 is typically threaded within the barrel 24 and abuts on the surface S2 of the lens 22 opposite to the lens seat 28, thus securing the lens 22 in the assembly 20. It is well known in the art that the lens is centered when both centers of curvature C1 and C2 lie on the center axis B of the lens barrel 24.

The technique consisting in inserting a lens in a lens barrel and then securing the lens with a threaded ring is generally referred to as the "drop-in" lens technique. The centering precision obtained from this technique first depends on the minimum allowable radial gap between the lens and the barrel. Thermal effects caused by the mismatch of the respective coefficients of thermal expansion of the lens and barrel materials also impacts on the centering of the lens. Manufacturing tolerances on dimensions of the components of the assembly such as the diameter of the lens, the diameter of the barrel cavity and the differences in thickness along the edge of the lens also affect the quality of the centering. The greater the precision required on the centering of the lens, the greater the manufacturing costs of both lens and barrel.

The main advantages of the drop-in technique are that the assembly time can be very short and that the lenses are removable. Low cost drop-in has, however, the drawback of a lower centering precision. The drop-in method may not be suitable when higher precision is required; then an active alignment is typically chosen. In this centering method, the lens is first positioned inside the cavity and its decentering relative to the reference axis of the barrel is measured. The lens is then moved to reduce the centering error. These steps can be repeated several times until the alignment of the lens complies with the centering requirements. Once centered, the lens is fixed in place with adhesive or other means. This method provides a very high level of centering accuracy, but requires expensive equipment while being time-consuming.

U.S. Pat. No. 9,244,245 (LAMONTAGNE et al.) introduced the concept of an auto-centering condition which can be exploited to ensure the precision centering of a lens within a barrel using a retaining ring. The auto-centering condition involves a relationship between the thread angle of the ring and barrel threads, and the radius of curvature of the second surface of the lens along its peripheral region. When this condition is met, any decentering of the retaining ring and a corresponding tilt of the retaining ring with respect to the center axis of the cavity have counterbalancing effects on the centering of the optical element with respect to the center axis. While this condition provides great improvements on previous centering techniques, in some circumstances it may not be readily available as the two main parameters, the thread angle and the radius of curvature of the second surface, may not be easily adjustable.

While the discussion above concerns mainly lenses, other types of optical elements can be mounted in a barrel using a retaining ring, and such elements are confronted with the same issues discussed above.

There therefore remains a need for an approach for mounting an optical element in a barrel which alleviates at least some of the drawbacks of known techniques.

SUMMARY

In accordance with one aspect, there is provided an optical assembly, comprising:
  a barrel having a cavity defining a center axis, the barrel being provided with a set of barrel threads;
  a seat provided in the cavity of the barrel;
  An optical element having first surface resting on the seat and a second surface opposite the first surface, said optical element having a peripheral mounting edge on a side of the second surface;
  A retaining ring affixed to the barrel through a set of ring threads complementary to the barrel threads and having a thread angle, the retaining ring comprising an abutment surface engaging the peripheral mounting edge of the optical element along a circular edge contact line, thereby securing the optical element between the seat and the retaining ring, the abutment surface having a frustro-spherical profile having a radius of curvature selected in view of the thread angle to maintain a centering of said circular edge contact line if the retaining ring is decentered in the cavity.

In accordance with another aspect, there is provided an optical assembly, comprising:
  a barrel having a cavity defining a center axis, the barrel being provided with a set of barrel threads;
  a seat provided in the cavity of the barrel;
  An optical element having first surface resting on the seat and a second surface opposite the first surface, said optical element having a peripheral mounting edge on a side of the second surface;
  A retaining ring affixed to the barrel through a set of ring threads complementary to the barrel threads and having a thread angle, the retaining ring comprising an abutment surface engaging the peripheral mounting edge of the optical element along a circular edge contact line, thereby securing the optical element between the seat and the retaining ring, the abutment surface having a frustro-conical profile having an inclination angle with respect to the center axis of the cavity selected in view of the thread angle to maintain a centering of said circular edge contact line if the retaining ring is decentered in the cavity.

In accordance with one aspect, there is provided an optical assembly comprising:
a barrel having a cavity and a set of barrel threads;
a seat provided in the cavity of the barrel;
an optical element having a first surface resting on the seat and a second surface opposite to the first surface, said optical element having a peripheral mounting edge; and
a retaining ring affixed to the barrel through a set of ring threads complementary to the barrel threads and having a thread angle. The retaining ring comprises an abutment surface engaging the peripheral mounting edge of the optical element along a circular edge contact line, thereby securing the optical element between the seat and the retaining ring, The abutment surface has a frustro-spherical profile having a radius of curvature $R_{Ring}$ given by the formula:

$$R_{Ring} = \sqrt{\left[\frac{d_{ring}}{2\tan(\varphi_{threads}/2)} - h - T/2\right]^2 + Y^2}$$

where:
$d_{ring}$ is a diameter of the retaining ring along the ring threads;
$\varphi_{thread}$ is a value of the thread angle;
Y is a half-diameter of the peripheral mounting edge;
h is a distance between (i) a first point of contact of the barrel threads with the ring threads proximate to the optical element and (ii) the edge contact line; and
T is a distance between (i) the first point of contact of the barrel threads with the ring threads proximate to the optical element and (ii) a last point of contact of the barrel threads with the ring threads farthest from the optical element diametrically opposite to the first point of contact.

In some implementations, the peripheral mounting edge is located at a junction of the second surface with a peripheral side wall of the optical element. In other implementations, the optical element comprises a bevelled surface joining the second surface to a peripheral side wall of the optical element. In some variants, the peripheral mounting edge is located at either a junction of the bevelled surface with the second surface, or a junction of said bevelled surface with the peripheral side wall. In other variants, first and second peripheral mounting edges are defined at respective junctions of the bevelled surface with the peripheral side wall and the second surface, and the abutment surface engages both the first and second peripheral mounting edges.

In some implementations, the seat may include one of an annular shoulder protruding from an inner wall of the barrel, a rearward facing surface of an additional optical element and an additional retaining ring inserted inside the cavity forward to the optical element.

In some implementations, the optical element may include a lens, a mirror, a diffractive optical element or a pinhole, having the first surface resting on the seat, and a spacer provided in the cavity and located between the retaining ring and said lens, mirror, diffractive optical element or pinhole, the peripheral mounting edge being provided on the spacer.

In some implementations:
the second surface of the optical element is concave;
the barrel threads extend on an outer wall of the barrel;
the retaining ring comprises an outer annular segment extending outside of the barrel and provided with the ring threads, said ring threads facing towards the barrel, the retaining ring further comprising an inner annular segment extending inside of the cavity and including the abutment surface.

In accordance with another aspect, there is provided an optical assembly, comprising:
a barrel having a cavity and a set of barrel threads, the cavity having a longitudinal center axis;
a seat provided in the cavity of the barrel;
an optical element having first surface resting on the seat and a second surface opposite the first surface, said optical element having a peripheral mounting edge along the second surface; and
a retaining ring affixed to the barrel through a set of ring threads complementary to the barrel threads and having a thread angle, the retaining ring comprising an abutment surface engaging the peripheral mounting edge of the optical element along a circular edge contact line or band, thereby securing the optical element between the seat and the retaining ring, the abutment surface having a frustro-conical profile having an inclination angle $\alpha$ with respect to a plane perpendicular to the longitudinal center axis of the cavity given by the formula:

$$\alpha = \sin^{-1}\left(\frac{Y}{\sqrt{\left[\frac{d_{ring}}{2\tan(\varphi_{threads}/2)} - h - T/2\right]^2 + Y^2}}\right)$$

where:
Y is a half-diameter of the peripheral mounting edge;
$d_{ring}$ is a diameter of the retaining ring along the ring threads;
$\varphi_{thread}$ is a value of the thread angle;
h is a distance between (i) a first point of contact of the barrel threads with the ring threads proximate to the optical element and (ii) the edge contact line; and
T is a distance between (i) the first point of contact of the barrel threads with the ring threads proximate to the optical element and (ii) a last point of contact of the barrel threads with the ring threads farthest from the optical element diametrically opposite to the first point of contact.

In some implementations, the peripheral mounting edge is located at a junction of the second surface with the peripheral side wall.

In some implementations, the optical element comprises a bevelled surface joining the second surface to the peripheral side wall, and the peripheral mounting edge is located at either a junction of the bevelled surface with the second surface, or at a junction of the bevelled surface with the peripheral side wall. In other variants, the bevelled surface defines the peripheral mounting edge, and the bevelled surface has a same inclination angle $\alpha$ as the frustro-conical profile with respect to a plane perpendicular to the longitudinal center axis.

In some implementations, the seat includes one of an annular shoulder protruding from an inner wall of the barrel, a rearward facing surface of an additional optical element, and an additional retaining ring inserted inside the cavity forward to the optical element.

In some implementations, the optical element comprises a lens, a mirror, a diffractive optical element or a pinhole having a surface defining the first surface resting on the seat, and a spacer provided in the cavity between the retaining ring and said lens, mirror, diffractive optical element or pinhole, the peripheral mounting edge being provided on the spacer.

In some implementations:
the second surface of the optical element is concave;
the barrel threads extend on an outer wall of the barrel;
the retaining ring comprises an outer annular segment extending outside of the barrel and provided with the ring threads, said ring threads facing towards the barrel, the retaining ring further comprising an inner annular segment extending inside of the cavity and including the abutment surface.

In accordance with another aspect, there is provided a retaining ring for securing an optical element in a cavity of a barrel provided with barrel threads and a seat, the optical element having a peripheral mounting edge having a half-diameter Y. The retaining ring comprises:

a set of ring threads engageable with the barrel threads to affix the retaining ring to the barrel, the ring threads having a thread angle; and an abutment surface engageable with the peripheral mounting edge of the optical element along a circular edge contact line, thereby securing the optical element between the seat and the retaining ring, the abutment surface having a frustro-spherical profile having a radius of curvature $R_{Ring}$ given by the formula:

$$R_{Ring} = \sqrt{\left[\frac{d_{ring}}{2\tan(\varphi_{threads}/2)} - h - T/2\right]^2 + Y^2}$$

where:
$d_{ring}$ is a diameter of the retaining ring along the ring threads;
$\varphi_{thread}$ is a value of the thread angle;
h is a distance between (i) a first point of contact of the barrel threads with the ring threads proximate to the optical element and (ii) the edge contact line; and
T is a distance between (i) the first point of contact of the barrel threads with the ring threads proximate to the optical element and (ii) a last point of contact of the barrel threads with the ring threads farthest from the optical element diametrically opposite to the first point of contact.

In some implementations, the ring threads are disposed along an outer perimeter of the retaining ring such that the retaining ring can be screwed inside the cavity.

In some implementations, the retaining ring comprises:
an outer annular segment configured to extend outside of the barrel and having a barrel-facing wall provided with the ring threads; and
an inner annular segment configured to extend inside of the cavity and including the abutment surface.

In accordance with yet another implementation, there is provided a retaining ring for securing an optical element in a cavity of a barrel provided with barrel threads and a seat, the optical element having a peripheral mounting edge having a half-diameter Y, the cavity having a longitudinal center axis. The retaining ring comprises:

a set of ring threads engageable with the barrel threads to affix the retaining ring to the barrel, the ring threads having a thread angle; and an abutment surface engageable with the peripheral mounting edge of the optical element along a circular edge contact line, thereby securing the optical element between the seat and the retaining ring, the abutment surface having a frustro-conical profile having an inclination angle $\alpha$ with respect to a plane perpendicular to the longitudinal center axis of the cavity given by the formula:

$$\alpha = \sin^{-1}\left(\frac{Y}{\sqrt{\left[\frac{d_{ring}}{2\tan(\varphi_{threads}/2)} - h - T/2\right]^2 + Y^2}}\right)$$

where:
$d_{ring}$ is a diameter of the retaining ring along the ring threads;
$\varphi_{thread}$ is a value of the thread angle;
h is a distance between (i) a first point of contact of the barrel threads with the ring threads proximate to the optical element and (ii) the edge contact line; and
T is a distance between (i) the first point of contact of the barrel threads with the ring threads proximate to the optical element and (ii) a last point of contact of the barrel threads with the ring threads farthest from the optical element diametrically opposite to the first point of contact.

In some implementations, the ring threads are disposed along an outer perimeter of the retaining ring such that the retaining ring can be screwed inside the cavity.

In some implementations, the retaining ring comprises:
an outer annular segment configured to extend outside of the barrel and having a barrel-facing wall provided with the ring threads; and
an inner annular segment configured to extend inside of the cavity and including the abutment surface.

Other features and advantages of the invention will be better understood upon a reading of embodiments thereof with reference to the appended drawings.

DETAILED DESCRIPTION

The description below is directed to optical assemblies that provide for the centering of an optical element in a barrel, simplifying the mounting and alignment of such optical elements. Embodiments of the invention relate to both optical assemblies and methods of mounting an optical element within a barrel.

Figure 1:
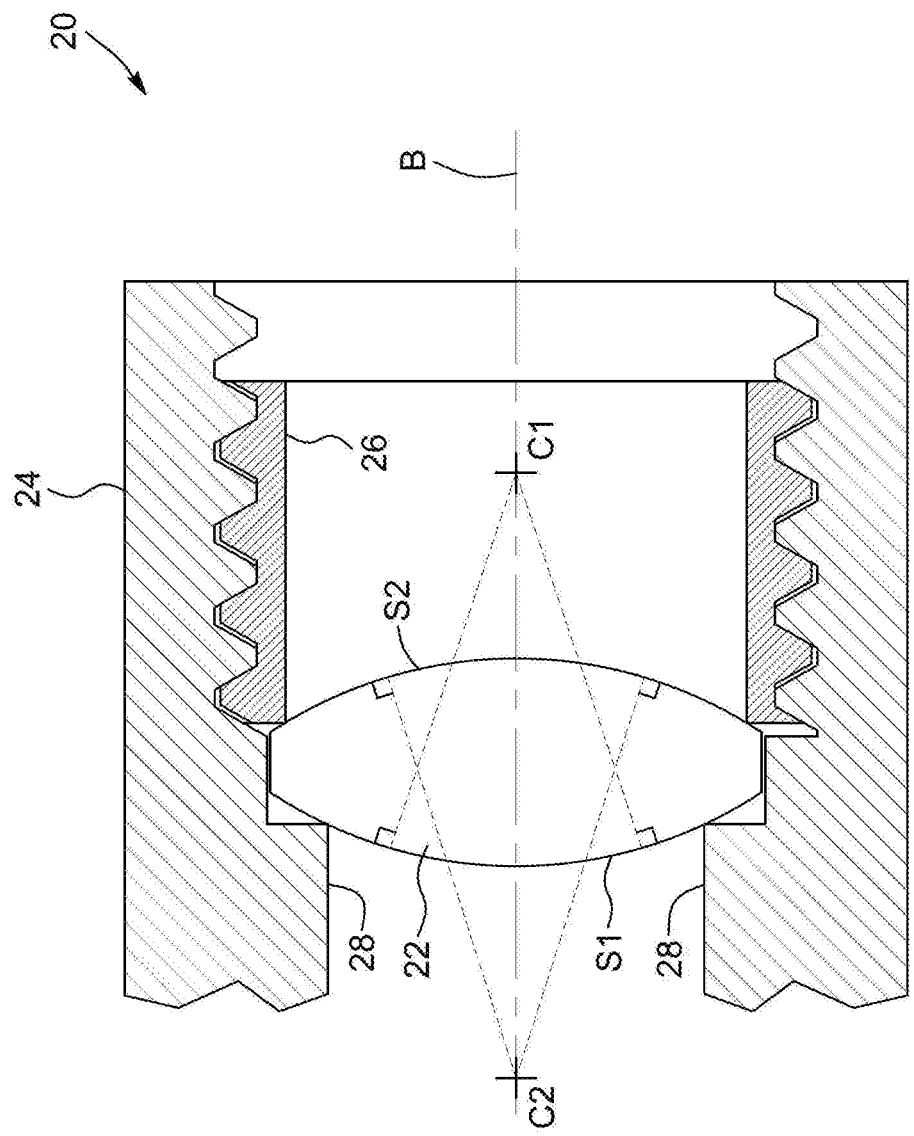
FIG. 1 (PRIOR ART) is a lens assembly showing a biconvex lens mounted in a lens barrel according to prior art.
Figure 2:
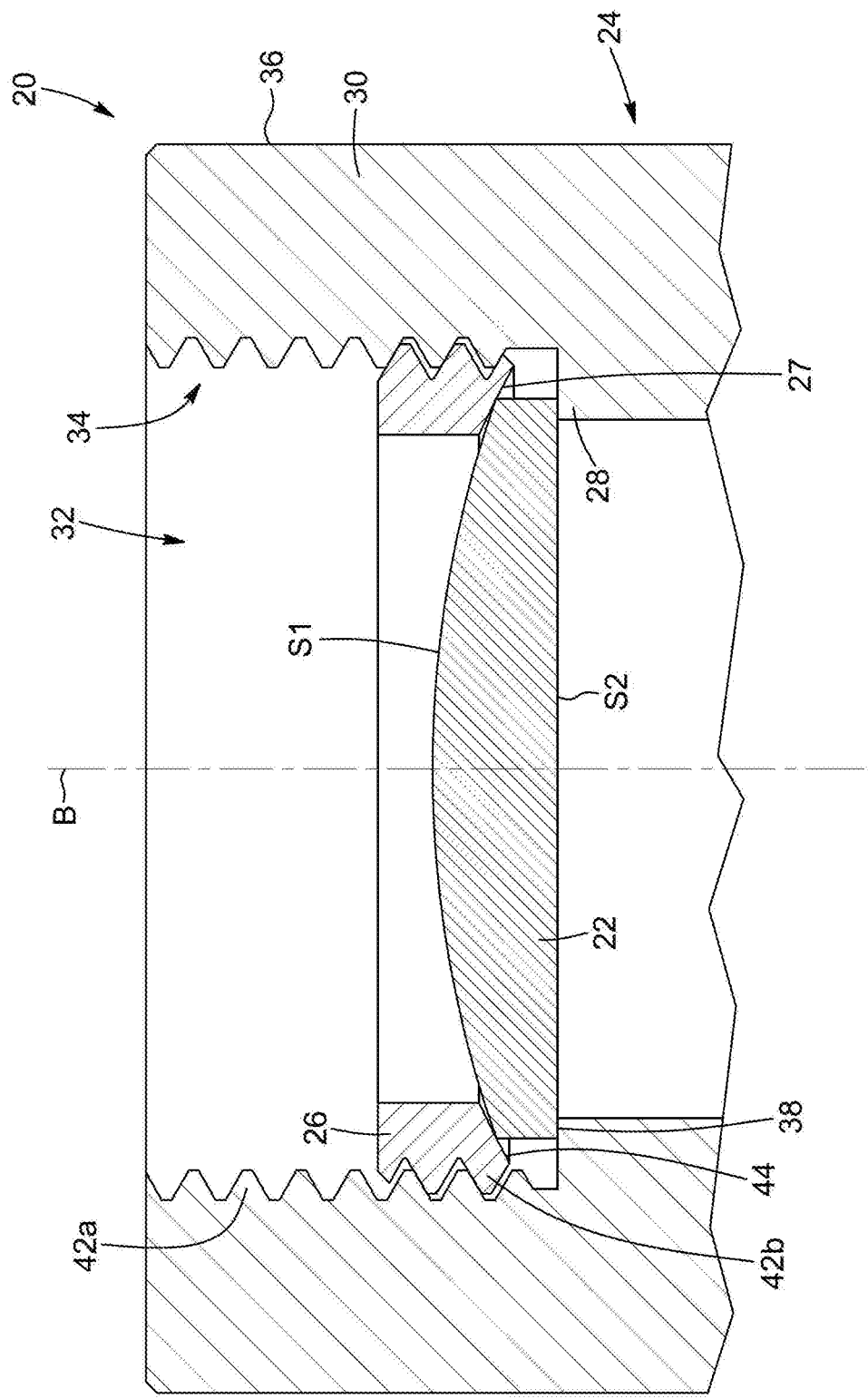
FIG. 2 is a schematic cross-sectional side view of an optical assembly including an optical element mounted in the cavity of a barrel through edge mounting according to one embodiment.
Figure 2A:
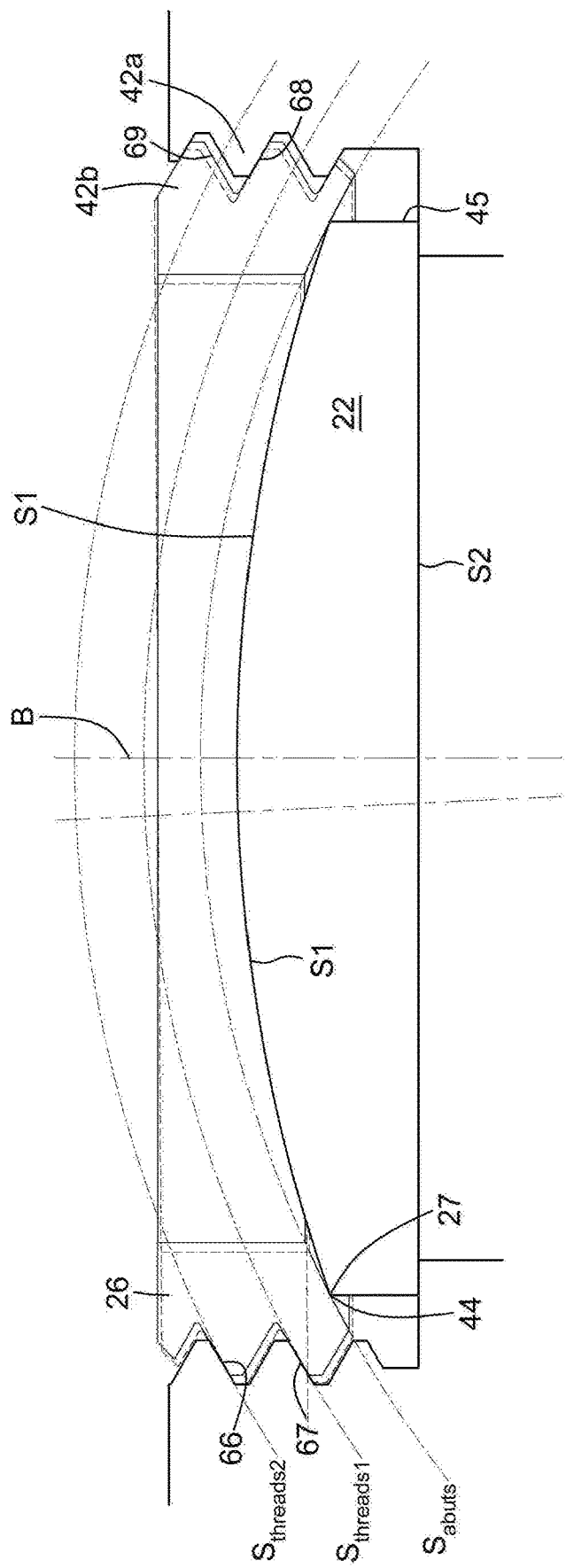
FIG. 2A is an enlarged view of a portion of FIG. 2.
Figure 2B:
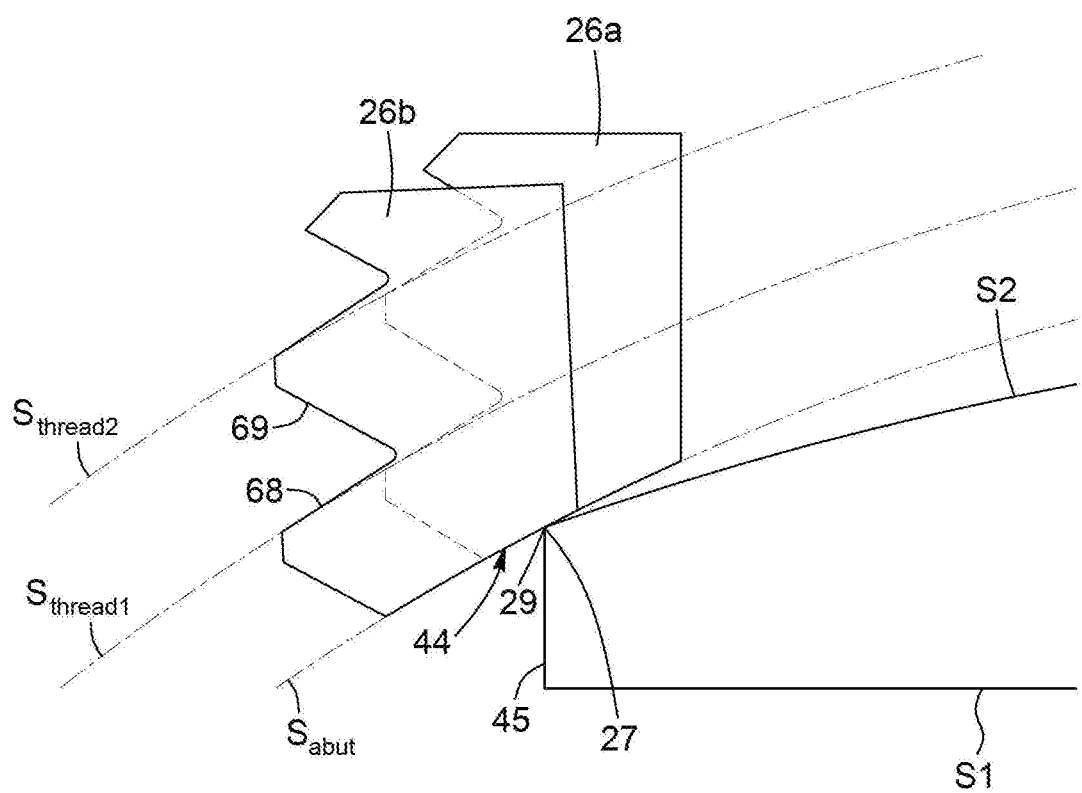
FIG. 2B is an enlarged view of a portion of FIG. 2A.

Referring to FIGS. 2, 2A and 2B, there is shown an optical assembly 20 according to one implementation. The optical assembly 20 generally includes a barrel 24 having a cavity 32, a seat 28 provided in the cavity 32 of the barrel 24, an optical element 22 mounted within the cavity 32, and a retaining ring 26. The optical element 22 is secured between the seat 28 and the retaining ring 26.

The optical element 22 may be embodied by any component acting on light in some fashion, for example to direct or change the direction of a light beam, focus or expand, collimate, filter, or otherwise transform or affect light. Examples of optical elements 22 include lenses of any type, such as for example, plano-convex, biconvex, plano-concave, biconcave, positive or negative meniscus lenses. Cemented doublet or triplet lenses of the types listed above can also be considered. The optical element 22 may also be embodied by diffractive lenses, mirrors, diffractive optical elements (DOEs), pinholes, reticles, or the like. The optical element 22 may have spherical or aspherical surfaces and may have an off-axis profile. The optical element 22 may also have one or two planar surfaces. In other embodiments, the optical element may be embodied by a more complex subassembly of optical components such as for example one or more lenses mounted in an inner sleeve, a mirror or a lens mounted in a spider, a lens or a lens barrel mounted in an optical mount which is itself mounted on an optical bench, etc. In other variants, the optical element 22 may be embodied by typical components of optical assemblies such as a prism, wave plate or camera. Other possibilities include optical fibers, detectors, corner cubes, light sources such as lasers, LEDs, LCDs, light bulbs, and the like, or a Micro-Opto-Electro-Mechanical System (MOEMS) such as for example a Digital Light Processing (DLP) system.

The optical element 22 has a first surface S1 and a second surface S2 opposite the first surface S1. It will be noted that throughout the present description, the "first" surface denotes by convention the surface facing the seat 28, whereas the "second" surface extends on the side of the retaining ring 26. It will be understood that this convention is used for ease of reference only and is not meant to confer any particular ranking or preferred orientation or characteristics to either surface. In the illustrated embodiment the optical element 22 is plano-convex, that is, the first surface S1 is planar and the second surface S2 is convex and has a constant radius of curvature. In various other embodiments, one or both of the surfaces of the optical element may be curved, either convex or concave, partially or in their entirety, in a variety of possible combinations. As explained above, embodiments of the invention may be applied to optical elements having a more complex construction such as aspherical lenses, compound lenses or other types of lenses, mirrors, DOEs, pinholes, etc. Variants involving optical elements having a shape other than plano-convex will be explained further below.

Figure 8A:
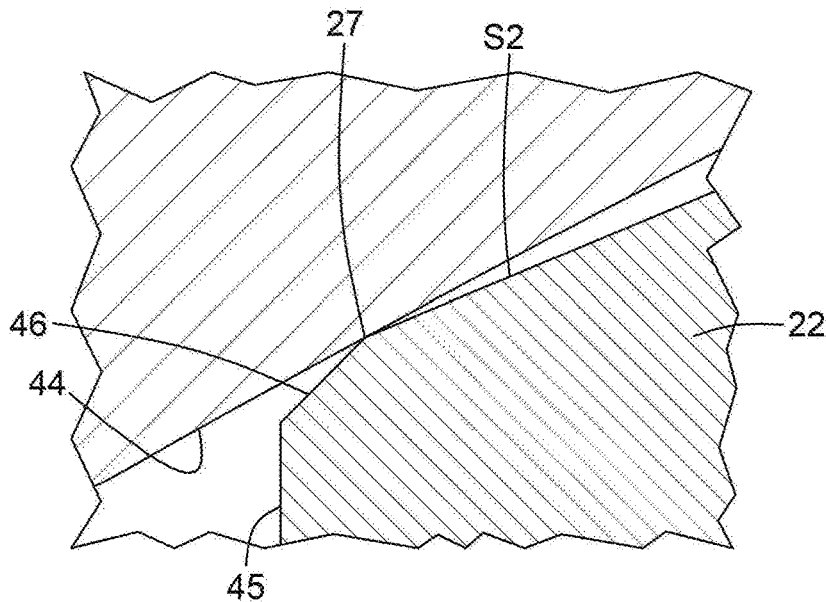
FIGS. 8A, 8B and 8C illustrate embodiments where the second surface of the optical element is provided with a chamfer, and where the peripheral mounting edge is provided at the junction of the chamfer with the second surface (FIG. 8A) and at the junction of the chamfer with a peripheral wall of the optical element (FIG. 8B), or on the chamfer itself (FIG. 8C).
Figure 8B:
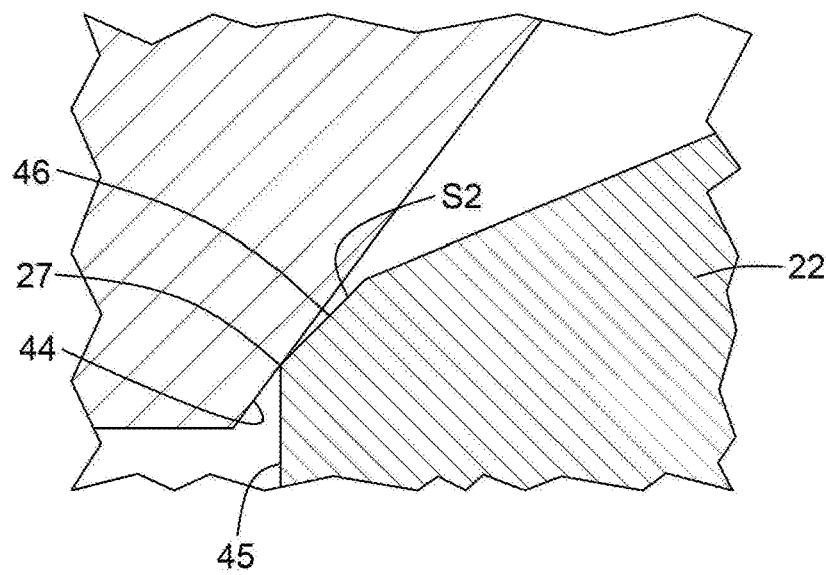

The optical element also has a peripheral mounting edge 27 along the second surface S2. In some variants, the second surface S2 is delimited by the peripheral mounting edge 27. In some embodiments, the optical element may include a peripheral side wall 45, and the peripheral mounting edge 27 may be located between the second surface S2 and the peripheral side wall 45. In the illustrated embodiment of FIGS. 2, 2A and 2B, the peripheral mounting edge 27 is located at a junction of the second surface S2 with the peripheral wall 45. In other variants, the optical element may be bevelled (as shown in FIGS. 8A and 8B and explained further below), that is, it includes a bevelled surface joining the second surface S2 and the peripheral wall 45. In such cases, the peripheral mounting edge 27 may be located at either the junction of the bevelled surface with the second surface S2 (FIG. 8A), or the junction of the bevelled surface with the peripheral wall 45 (FIG. 8B). It will be understood that in cases where the outer shape of the optical element defines a more complex structure, the peripheral mounting edge may be defined by a boundary between different surfaces of the optical element.

The barrel 24 may be embodied by any structure in which one or more optical elements may be mounted and centered. Typical barrels such as the one illustrated in FIG. 2 include a hollow cylindrical housing 30 having an inner wall 34 and an outer wall 36. It will be readily understood that the barrel 24 may have any shape, mechanical features or additional components adapted to engage, connect to or otherwise interact with other structures as required by the context in which the optical assembly 20 is to be used. For example, the outer wall 36 of the barrel 24 may be provided with threads, holes, pins, projections, flanges and the like without departing from the scope of the invention. Alternatively, the barrel 24 may be an integral part of a larger optical assembly, such as for example a camera objective or a microscope objective. As discussed further below, in other variants the barrel may be embodied by an optical mount such as typically used on optical benches and set ups to hold lenses and the like.

The cavity 32 may have any shape adapted to receive the optical element 22 therein. The cavity 32 has a center axis B, defined as its symmetry axis. The optical element 22 can be considered properly aligned within the barrel 24 when the centers of curvature of all curved surfaces S1 and S2 lie on the center axis B.

As mentioned above, the optical assembly 20 includes a seat 28 provided in the cavity 32. The first surface S1 of the optical element 22 rests on the seat 28. In some embodiments, the seat 28 is defined by an annular shoulder 38 protruding from the inner wall 34 within the cavity 32. In some embodiments, the shoulder 38 may form a right angle with respect to the inner wall 34 of the barrel 24. In some variants, the first surface S1 may rest on the corner edge of the shoulder 38. Optionally, the corner edge can be rounded or bevelled by polishing or machining to avoid damaging the first surface S1 of the optical element 22. In other variants, the first surface may rest on a surface of the shoulder 38. It will be readily understood that in other embodiments the contact between the first surface S1 and the seat 28 may be different. Furthermore, in some embodiments the seat 28 need not extend along the entire circumference of the inner wall 34 of the barrel but may include missing portions or other discontinuities, or may be embodied by a plurality of radially aligned projections spaced apart along the inner wall. In other implementations, the seat 28 may be embodied by a separate structure affixed to the barrel, such as for example a ring-shaped component threaded to the barrel or otherwise affixed to the barrel. In other embodiments, the seat 28 may be made up of a rearward facing surface of an additional optical element, or a retaining ring or inserted inside the cavity forward of the optical element 22.

Figure 3A:
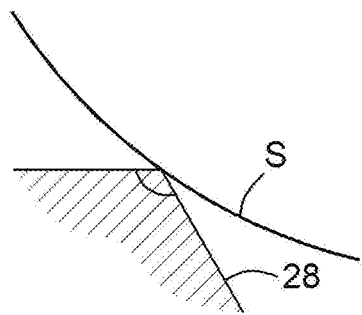
FIGS. 3A to 3E are schematic representations of different types of engagements between a surface of an optical element and a seat.
Figure 3B:
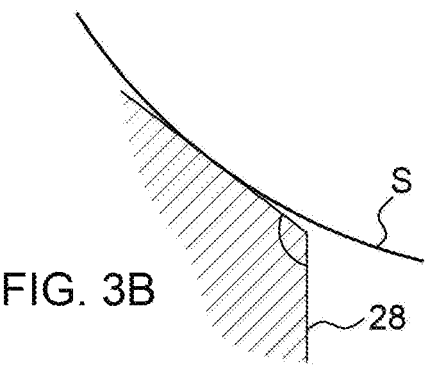
Figure 3C:
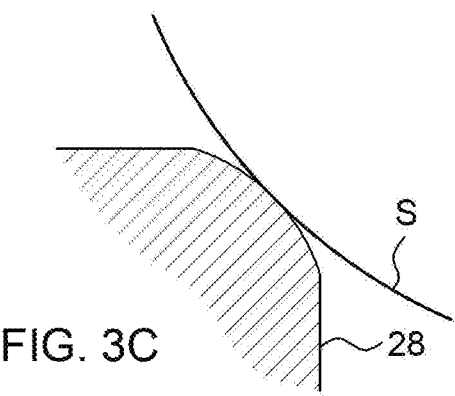
Figure 3D:
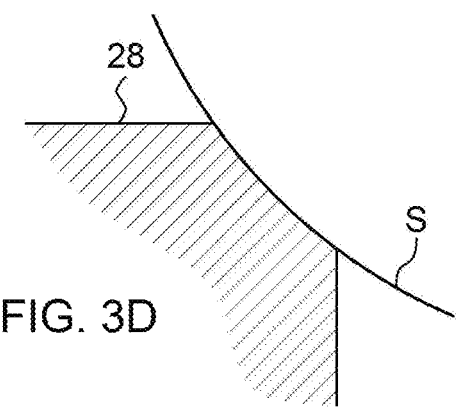
Figure 3E:
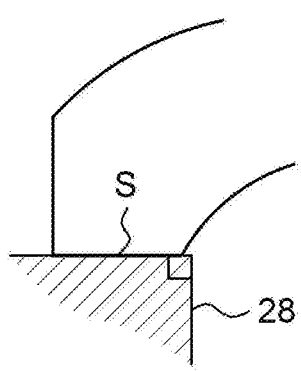

Referring to FIGS. 3A to 3E, different types of possible engagement schemes between a surface S and a seat 28, which can for example embody the engagement of the first surface of the optical element with the seat of the barrel of the present optical assembly, are schematically illustrated. FIG. 3A shows an edge contact, where the curved surface S rests on an edge of the seat 28. It can be noted that the edge need not define a right angle. FIG. 3B shows a tangential contact, where the curved surface S rests on a wall of the seat that is oriented along a tangent of the surface S at the point of contact. In the variants of FIGS. 3C and 3D the seat 28 itself is curved, with a curvature opposite to that of the surface S in FIG. 3C such that they are in toroidal contact, and with a curvature matching that of the surface S in the example of FIG. 3D to define a spherical contact. In the latter example, the point of contact becomes a surface of contact. Finally, in some embodiments the surface S may be planar at least in the region where it abuts on the seat 28, enabling a planar (surface) contact such as shown in FIG. 3E.

Referring back to FIGS. 2, 2A and 2B, the barrel 24 is provided with a set of barrel threads 42a. The retaining ring 26 is affixed to the barrel 24 through a set of ring threads 42b complementary to the barrel threads 42a. The expression "threads" is meant to refer to engageable helicoidal projections on two components allowing one component to be screwed on or within the other. By convention, a single thread is generally considered to be the portion of a helicoidal projection corresponding to one screw turn, whereas the length of the projection defining the entire screw path is referred to as threading or a set of threads. As their names entail, the barrel threads are provided along a wall of the barrel whereas the ring threads are provided along a wall of the retaining ring. In the illustrated embodiment the barrel threads are disposed along the inner wall 34 of the barrel 24 whereas the ring threads are along the outer perimeter of the retaining ring 26, such that the retaining ring can be screwed inside the cavity 32. The threads 42a, 42b may alternatively be positioned such that the retaining ring is screwed on the outside of the barrel, as explained below with respect to other embodiments. Each set of threads can be defined by forward thread faces, facing inwardly of the cavity and towards the seat, and rearward thread faces, facing outwardly of the cavity and away from the seat. It will be readily understood that either set of threads 42a, 42b need not be continuous along the entire screw path, but may include missing segments or other discontinuities as long as sufficient contact points are provided to allow engagement of the complementary threads.

Figure 4A:
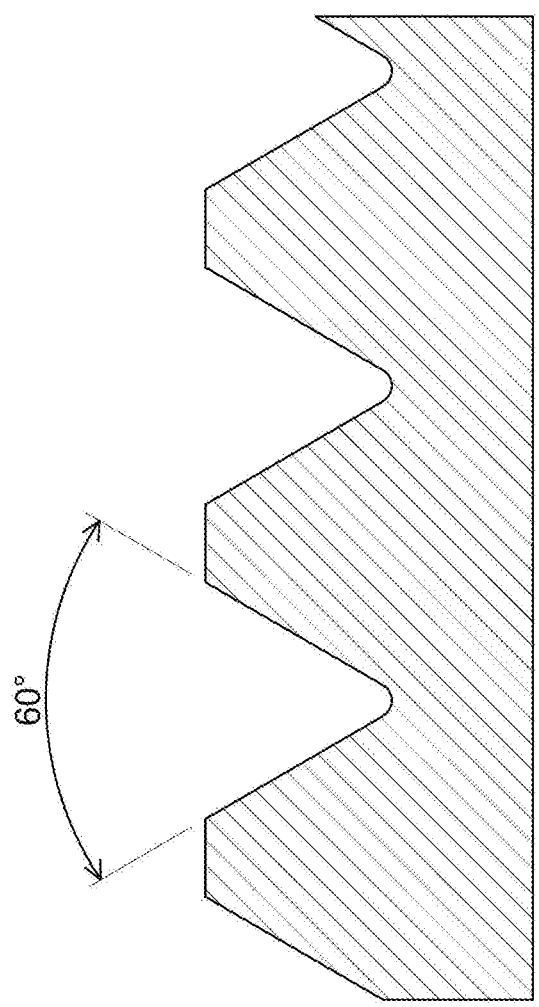
FIGS. 4A to 4D illustrate different types of thread shapes.
Figure 4B:
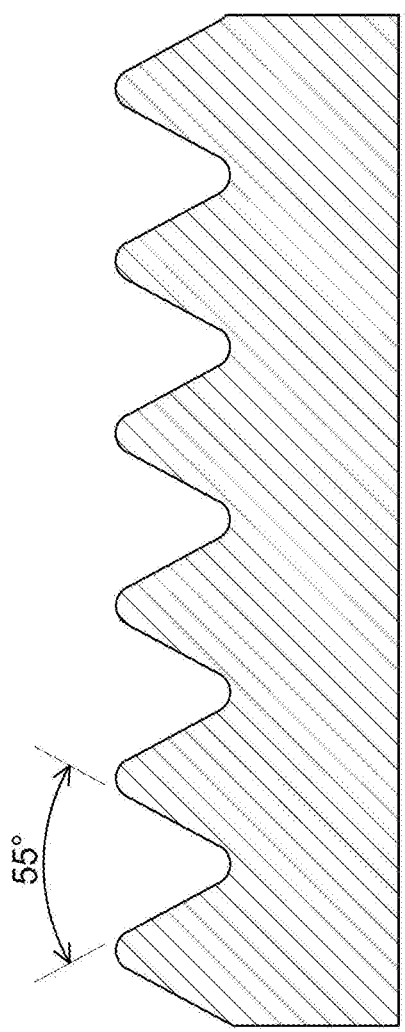
Figure 4C:
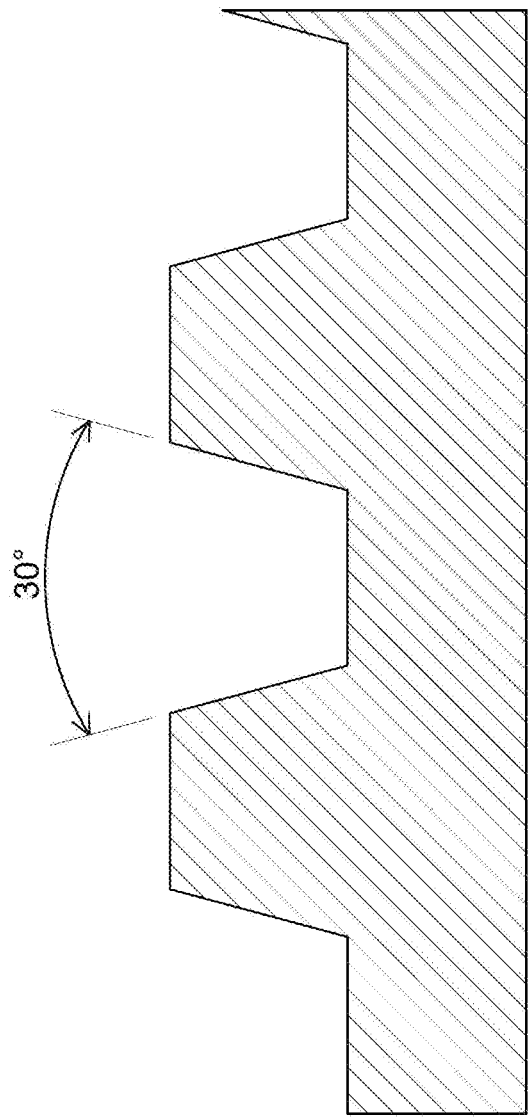
Figure 4D:
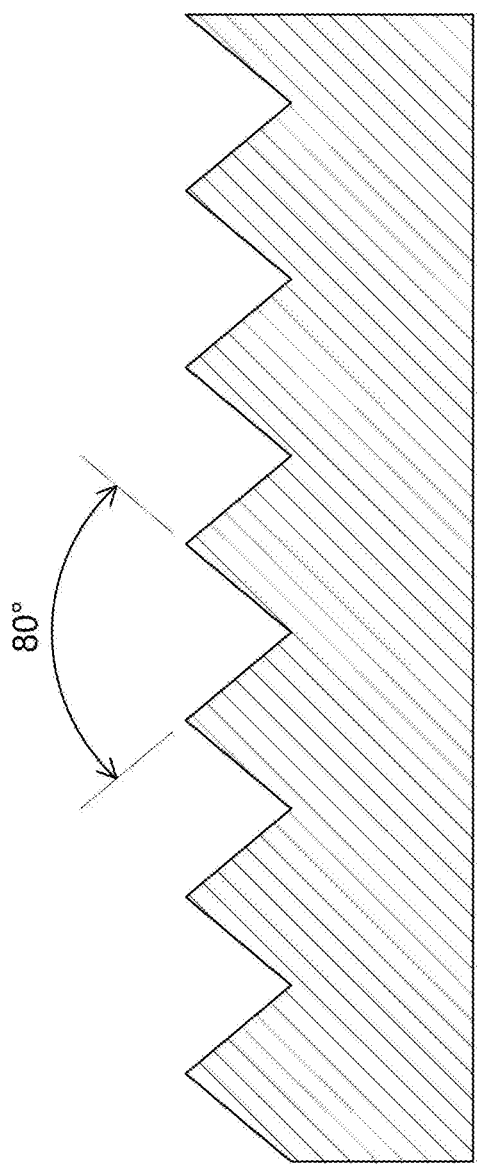

The barrel threads 42a and ring threads 42b have a common cross-sectional thread shape, thread angle and pitch. By definition, the thread angle is the angle formed by the opposite walls of a thread when viewed in cross-section, while the pitch of a thread set is the spacing between two consecutive crests in a set of threads. By «complementary», it is understood that the profiles of the barrel threads 42a and ring threads 42b are such that they can be screwed together, which usually involves a same pitch (within mechanical tolerances allowing their proper engagement and relative rotation). Although the barrel threads 42a and ring threads 42b are shown as having a same overall shape in the illustrated embodiments, in other variants they may have different shapes as long as the complementary condition as explained above is met. Referring to FIGS. 4A to 4D, various cross-sectional thread shapes are illustrated, by way of example. FIG. 4A shows a truncated triangular thread shape with a thread angle of 60°, which is representative of a common thread standard. The crest of each thread is shown as truncated, although in different embodiments the thread shape may define a regular triangle. In the example of FIG. 4B, the crests and grooves of the threads are shown as having a rounded shape, and the thread angle is shown as 55°. The thread shapes shown in FIGS. 4A and 4B are commonly used for mounting optical components. However, other thread shapes are also known in the art, such as a trapezoidal shape (FIG. 4C), or a regular triangular shape (FIG. 4D). In other variants, the thread shape may be non-symmetrical, that is, the opposite walls of a thread may be oriented at different angles with respect to a plane perpendicular to the center axis of the cavity. Of course, the shapes and thread angles shown herein are given by way of example only and should not be construed as exhaustive representations of possible thread profiles.

Figure 5A:
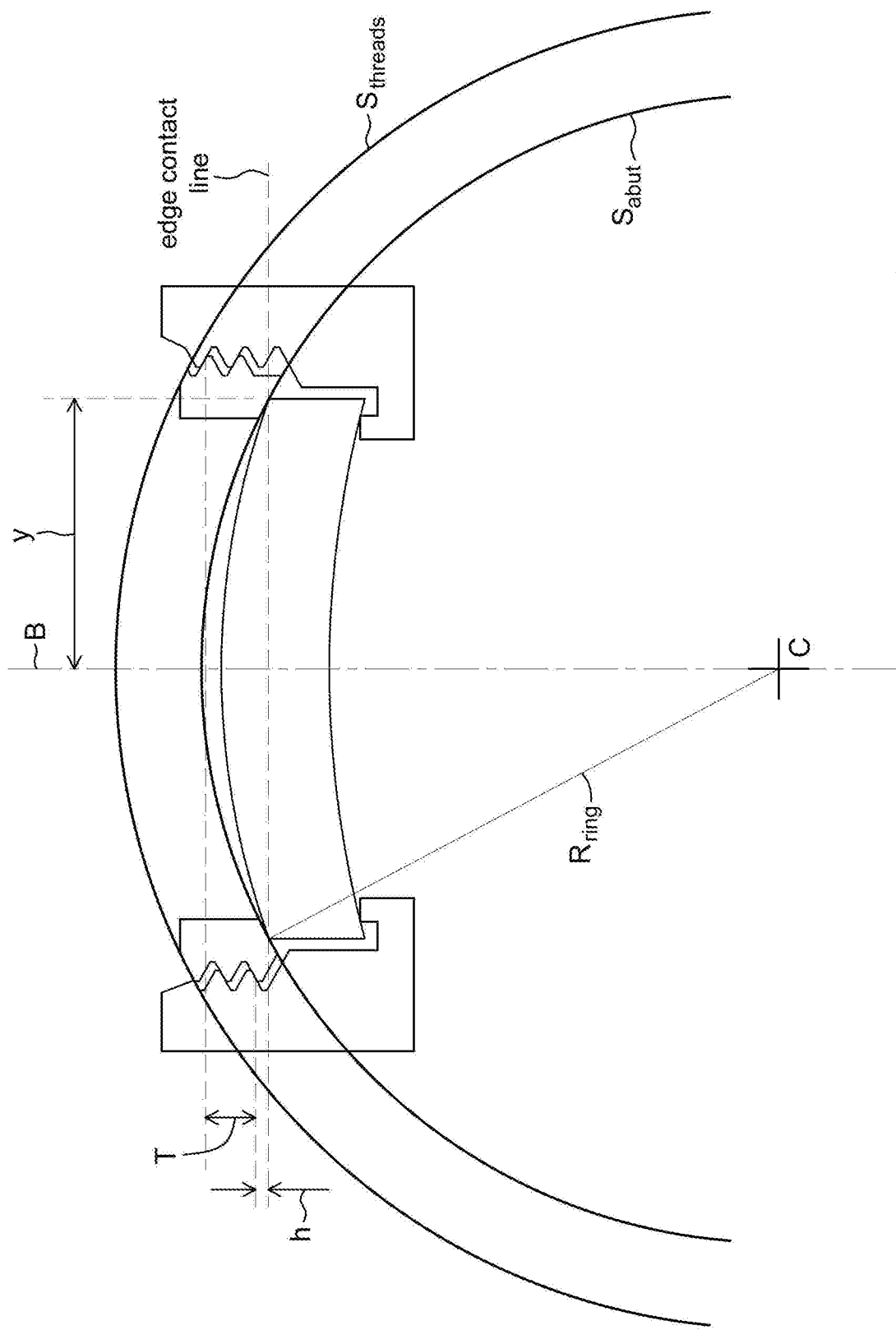
FIG. 5A illustrates the edge mounting of an optical element by a retaining ring having a frustro-spherical profile by showing two different positions of the retaining ring along the imaginary spheres $S_{threads}$.
Figure 5B:
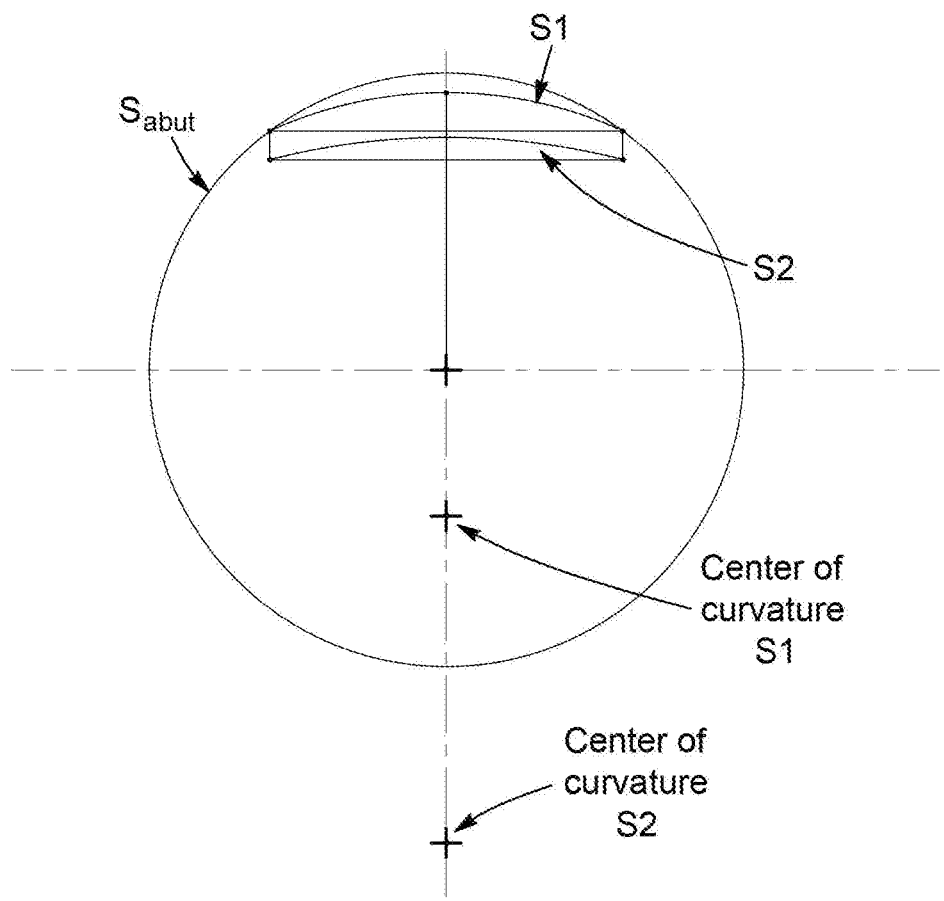
FIG. 5B shows the alignment of the centers of curvature of the first and second surfaces S1 and S2 on the center axis as a result of this centering approach.

Referring again to FIGS. 2, 2A and 2B and additionally to FIGS. 5A and 5B, the retaining ring 26 has an abutment surface 44 engaging the peripheral mounting edge 27 of the optical element 22. As will be readily understood by one skilled in the art, the one-dimensional nature of the peripheral mounting edge results in a circular edge-contact line between the retaining ring and the optical element. This engagement is also described here as "edge mounting" or "edge contact mounting".

In accordance with one aspect, the abutment surface 44 of the retaining ring has a frustro-spherical profile, that is, it defines a short segment of circular arc having a symmetry of revolution about the center axis of the retaining ring. The radius of curvature of the abutment surface is selected in view of the thread angle to maintain a centering of said edge contact line even in presence of a decentering of the retaining ring relative to the center axis of the cavity, as explained further below.

As known in the art, engageable sets of threads have a certain degree of play between them to enable their relative motion. In the present context, this play leads to a potential decentering of the retaining ring within the cavity, this decentering being accompanied by a tilt of the retaining ring. It can be demonstrated that the lateral motion of the retaining ring within the cavity as the retaining ring is screwed in against the optical element is constrained along the surface of imaginary spheres $S_{threads1}$, $S_{threads2}$, ... having their center C approximatively positioned at a common point located on the center axis B of the cavity. These spherical surfaces $S_{threads}$ describe the trajectory of the line of contact between the forward faces 67 of the barrel threads with the rearward faces 68 of the ring threads.

By providing the abutment surface 44 of the retaining ring 26 with a frustro-spherical profile having a radius of curvature $R_{ring}$ defining a sphere $S_{abut}$ concentric with the spheres $S_{threads}$ describing the movement of the retaining ring 26 within the threads of the barrel 24, then the edge contact line defined by the intersection of the abutment surface 44 with the peripheral mounting edge remains at a same position regardless of the possible decentering of the retaining ring in the cavity. This is for example illustrated in FIG. 2A by showing two different positions 26a and 26b of the retaining ring 26 along the imaginary spheres $S_{threads}$. In the two positions, the edge contact line 29 extends along a different portion on the abutment surface 44, but always remains at the same location with respect to the cavity. The peripheral mounting edge 27 of the optical element 22 is therefore always centered by the retaining ring 26, regardless of the possible decentering of the retaining ring 26. FIG. 5B also shows the alignment of the centers of curvature of the first and second surfaces S1 and S2 on the center axis as a result of the centering approach described above.

It can be demonstrated that the above condition may be met if the radius of curvature of the abutment surface $R_{ring}$ is determined from the following equation:

$$R_{Ring} = \sqrt{\left[\frac{d_{ring}}{2\tan(\varphi_{threads}/2)} - h - T/2\right]^2 + Y^2} \quad (1)$$

Where:
$R_{ring}$ is the radius of curvature of the abutment surface of the retaining ring;
$d_{ring}$ is the diameter of the retaining ring along the ring threads;
$\varphi_{thread}$ is the value of the thread angle;
Y is a half-diameter of the peripheral mounting edge;
h is the distance between (i) a first point of contact of the barrel threads with the ring threads proximate to the optical element and (ii) the edge contact line; and
T is the distance between (i) the first point of contact of the barrel threads with the ring threads proximate to the optical element and (ii) a last point of contact of the barrel threads with the ring threads farthest from the optical element diametrically opposite to the first point of contact.

Advantageously, the edge mounting technique described above may provide substantially the same centering precision for a broad range of geometries of the second surface S2 of the optical element. This is best understood from FIGS. 6A to 6C, where it is shown that a same retaining ring 26 can be used to center lenses 22 having second surfaces of different radii of curvature.

Figure 7:
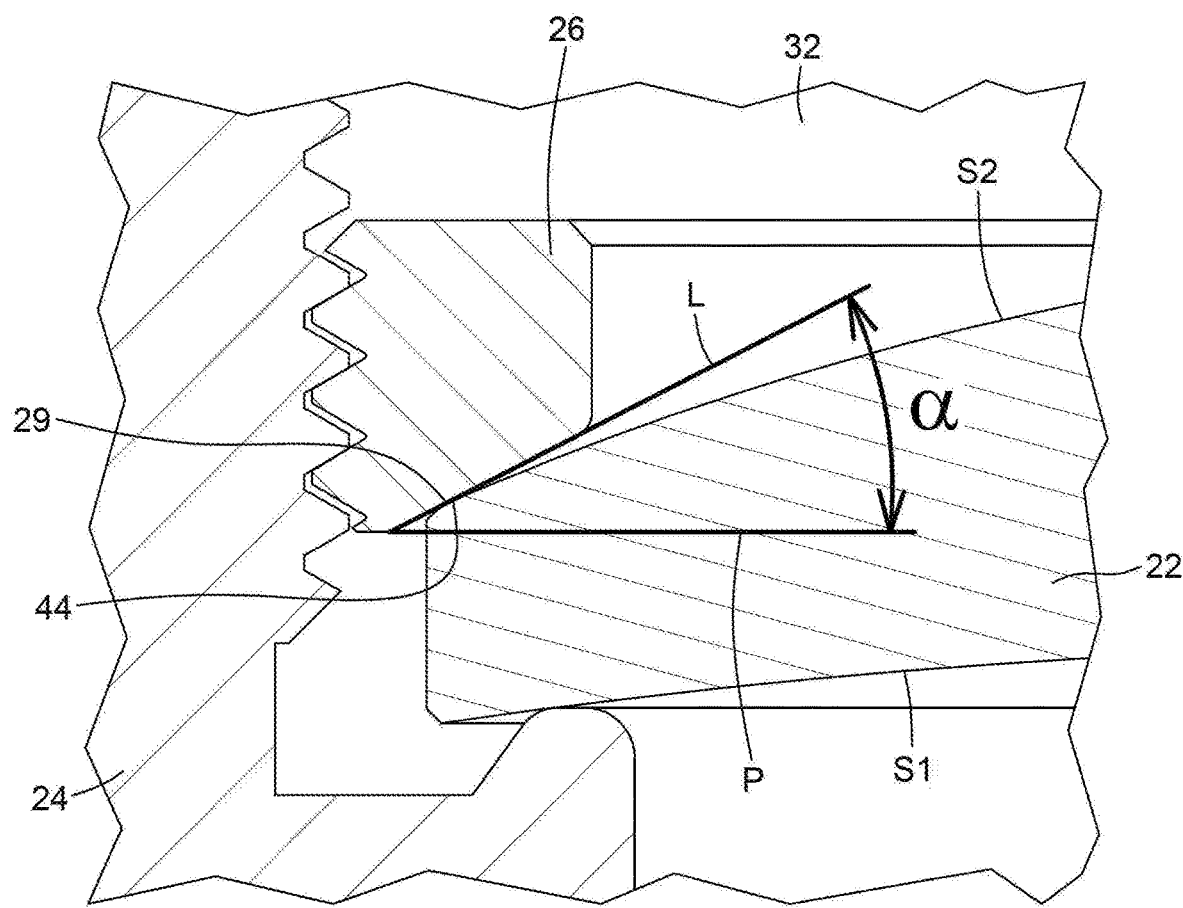
FIG. 7 is a partial cross-sectional side view of an optical assembly where the abutment surface of the retaining ring has a frustro-conical profile.

Referring to FIG. 7, in some implementations, the play between the retaining ring 26 and the barrel 24 may be small enough that the centering of the edge contact line can be substantially maintained with an abutment surface 44 having a frustro-conical profile, that is, it defines an inclined linear segment L having a symmetry of revolution about the center axis of the retaining ring 26. The inclination angle α of the abutment surface 44 with respect to a transversal plane of the cavity P (a plane perpendicular to the center axis) is selected in view of the thread angle to maintain a centering of the edge contact line 29 if the retaining ring 26 is decentered in the cavity 32. It can be demonstrated that this condition is met if:

$$\alpha = \sin^{-1}\left(\frac{Y}{R_{Ring}}\right) \quad (2)$$

where:
α is the inclination angle of the abutment surface with respect to the transversal plane of the cavity;
Y is the half-diameter of the lens mounting edge; and
$R_{Ring}$ is the radius of curvature of the equivalent frustro-spherical profile of the retaining ring which defines a sphere $S_{ring}$ concentric with the imaginary spheres $S_{threads}$ describing the movement of the retaining ring as explained above. $R_{Ring}$ is therefore given by equation (1) and depends on the diameter of the retaining ring along the ring threads $d_{ring}$, the value of the thread angle $\varphi_{thread}$, the half-diameter of the peripheral mounting edge Y, and the distances h and T.

Combining equations (1) and 2, one obtains:

$$\alpha = \sin^{-1}\left(\frac{Y}{\sqrt{\left[\frac{d_{ring}}{2\tan(\varphi_{threads}/2)} - h - T/2\right]^2 + Y^2}}\right) \quad (3)$$

Figure 8C:
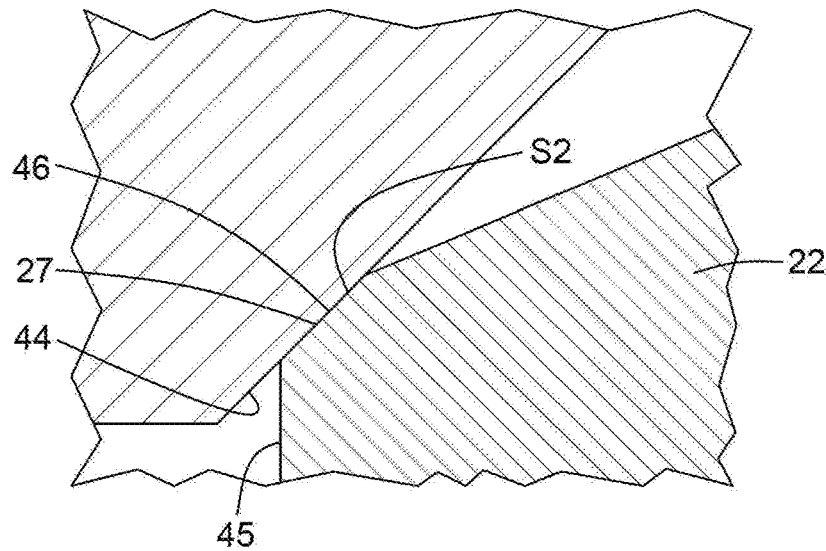

Referring to FIGS. 8A, 8B and 8C, in some implementations the optical element 22 may include a bevelled surface joining the second surface S2 and the peripheral side wall 45, also known as a chamfer 46. Some lenses are typically provided with chamfers to avoid sharp edges which may lead to chipping or cracking. Chamfers in such contexts are typically inclined at an angle of 45°, but other angle values are possible. Referring to FIG. 8A, in some variants the abutment surface 44 may be mounted on the junction of the second surface S2 with the chamfer 46, which then defines the peripheral mounting edge. Alternatively, as shown in FIG. 8B, the peripheral mounting edge is defined as the junction of the peripheral side wall 45 and the chamfer 46. Finally, referring to FIG. 8C, in yet another variant the bevelled surface or chamfer 46 may define the peripheral mounting edge. In this case, the bevelled surface has the same inclination angle α as the frustro-conical profile with respect to a plane perpendicular to the longitudinal center axis. In this variant the contact between the abutment surface 44 and the bevelled surface therefore defines a circular contact band instead of a line, or a "thick line" of thickness corresponding to the cross-sectional length of the chamfer 46. Alternatively, if the abutmet surface 44 gas a frustro-spherical profile the bevelled surface may define first and second peripheral mounting edges being at respective junctions of the bevelled surface with the peripheral side wall and the second surface, and the abutment surface engaging both the first and second peripheral mounting edges.

In some implementations, the thread angle may be of the order of 90° or greater. Using a 90° thread angle can lead to a local contact angle on the retaining ring close to 45°, which can increase the sturdiness of the assembly, especially under environmental constraints such as temperature variations and vibrations. In embodiments where the thread angle leads to a contact angle larger than 90°, then the peripheral mounting edge may be defined as the junction of the peripheral side wall with the chamfer, as shown in FIG. 8B.

Figure 6A:
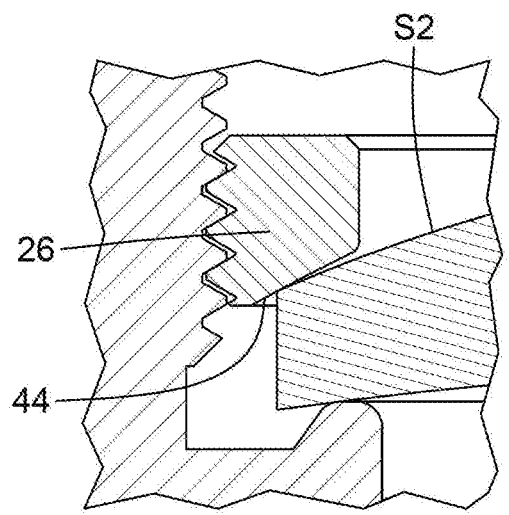
FIGS. 6A to 6C are partial cross-sectional side views of optical assemblies where a same retaining ring is used to center lenses having second surfaces of different radii of curvature.
Figure 6B:
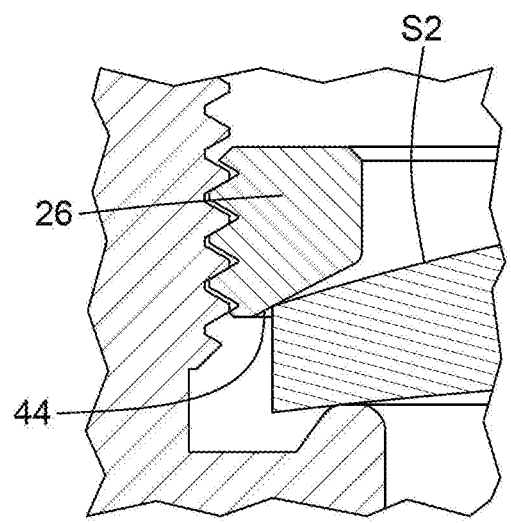
Figure 6C:
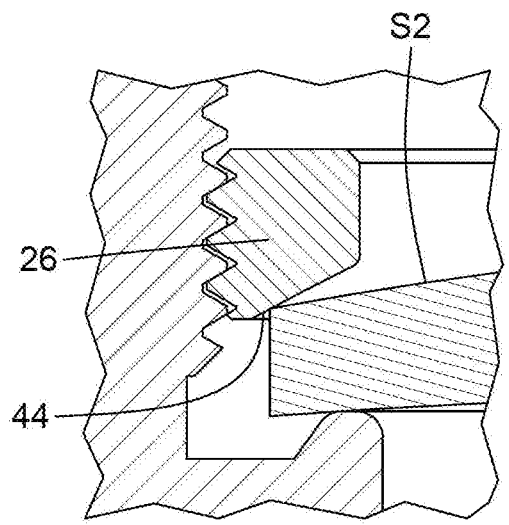

It is to be noted that for lenses with second surfaces S2 of small radii of curvature, the tangent angle made by the abutment surface 44 with the peripheral mounting edge 27 becomes greater. For case where this angle approaches 45°, lenses are generally not provided with chamfers. The peripheral mounting edge in such cases is therefore preferably defined as the junction of the peripheral side wall 45 with the second surface S2, as shown in FIGS. 6A to 6C.

Figure 9A:
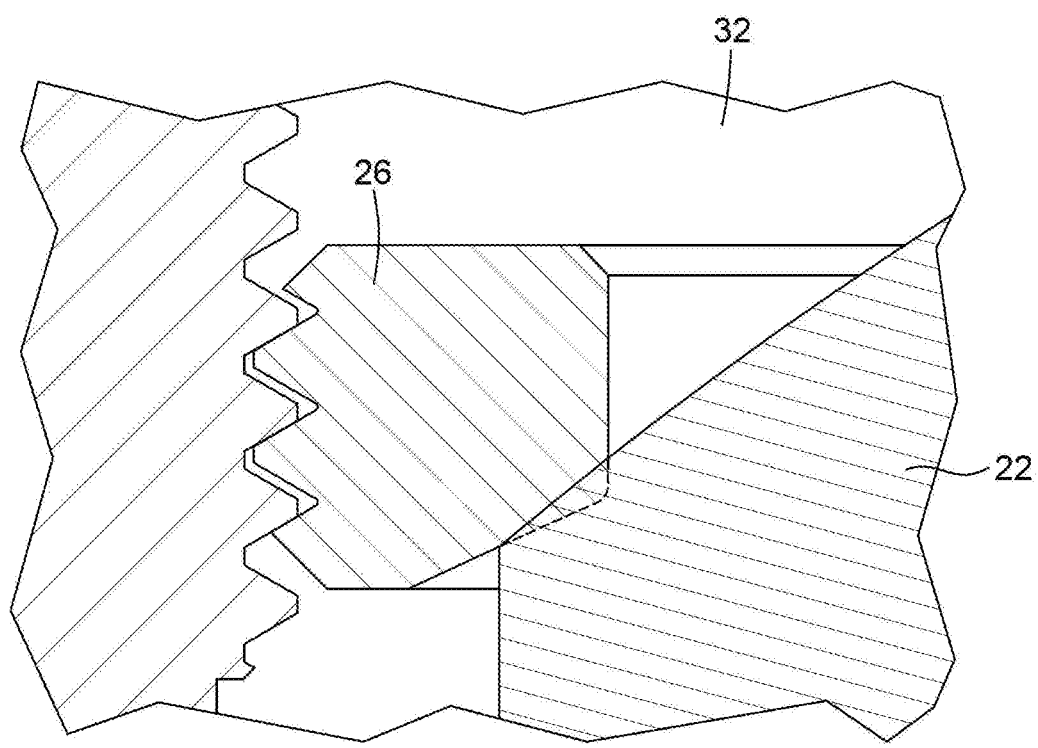
FIG. 9A illustrates a case where the edge mounting approach would not be physically possible as the second surface of the lens would block the trajectory of the retaining ring.

In some instances, the radius of curvature of a frustro-spherical abutment surface or the inclination angle of a frustro-conical abutment surface may lead to a situation where the edge mounting approach would not be physically possible as the second surface S2 of the lens would block the trajectory of the retaining ring. This is for example illustrated on FIG. 9A. In such cases, changing the parameters of the retaining ring 26 and cavity 32, for example increasing the thread angle, can allow the edge-contact mounting of the present description to be performed. In other variants, for example if the use of a standard thread angle is desired or required, this issue may be circumvented using a spacer in the cavity between the lens and the retaining ring.

Figure 9B:
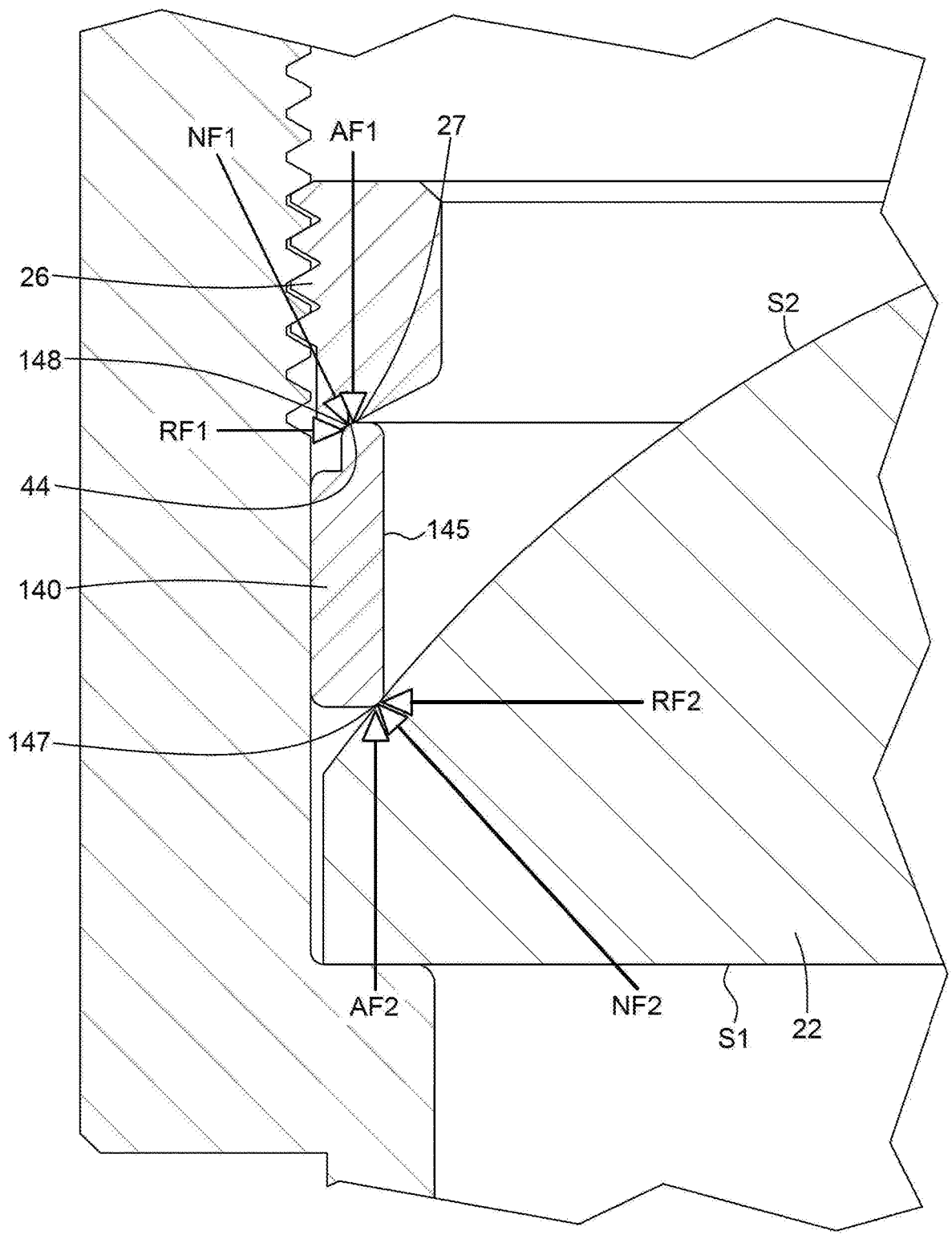
FIG. 9B shows the use of a spacer allowing to circumvent the issue shown in FIG. 9A.

Referring to FIG. 9B, there is shown such a variant where a spacer 140 is provided between a lens 22 and the retaining ring 26. In this context, the optical element is considered to be the combination of the lens 22 and spacer 140, the lens, having a surface defining the first surface S1 resting on the seat while the peripheral mounting edge is provided on the spacer 140. In this implementation, the abutment surface 44 of the retaining ring 26 having a frustro-spherical or frustro-conical abutment surface as explained above therefore engages the spacer through edge mounting of its peripheral mounting edge 27. A mirror, a diffractive optical element or a pinhole may be used instead of a lens.

In some implementations, the spacer 140 is a resilient spacer such as defined in U.S. patent application Ser. No. 62/960,845, the entire contents of which being incorporated herein by reference. The resilient spacer 140 may have a generally cylindrical shape including a cylindrical wall 145 and opposite frontward and rearward rims 147 and 148. The frontward rim 147 (facing towards the seat when inserted in the cavity) engages the second surface S2 of the lens 22, whereas the rearward rim 148 (facing away from the seat when inserted in the cavity) defines or includes the peripheral mounting edge 27. In accordance with some implementations, the resilient spacer 140 may be resiliently deformable to a compressed state in which its outer dimensions allows its insertion within the cavity, and a biased state, in which the cylindrical wall 145 of the resilient spacer has an expanded diameter and contacts the inner wall of the cavity. When in the compressed state, the resilient spacer 140 can therefore be slid into the cavity until it reaches the desired position, where it abuts on the second surface S2 of the lens 22. Once released from the compressed state, the spring constant of the resilient spacer 140 tends to bias the resilient spacer 140 outwardly, so that the outer surface of the cylindrical wall 145 presses against the inner wall of the cavity, therefore eliminating any lateral play on the position of the resilient spacer 140. In some implementation, the resilient spacer may include a slit machined through a portion of the cylindrical wall along its full length. The resilient spacer 40 is preferably made of a resilient material such as metals or plastics.

In order for the resilient spacer 140 to provide the desired centering of the lens, two conditions are preferably met. On the one hand, the abutment surface of the retaining ring preferably engages the rearward rim 148 of the spacer 140 along a circular edge contact line precisely centered within the cavity, which can be accomplished through a properly selected frustro-spherical or frustro-conical profile meeting the conditions explained above. On the other hand, the engagement of the spacer 140 with the abutment surface 44 of the retaining ring 26 and with the second surface S2 of the lens element preferably apply an outward resulting force to the resilient spacer 140. In the illustrated embodiment of FIG. 9B, as the abutment surface 44 is concave, the radius of curvature of the second surface S2 of the lens is preferably convex and greater than the radius of curvature of the abutment surface 44 of the retaining ring 26. Advantageously, this approach will therefore be useful in all cases where classical edge-mounting would be impossible because the radius of curvature of the second surface S2 of the optical element is too small.

It will be readily understood by one versed in the art, from a reading of the present specification as a whole, that the optical assembly should allow for some motion between the first surface S1 of the optical element and the seat 28, and between the second surface S2 of the optical element and the retaining ring. In some embodiments, this implies that the optical element meets the so-called "self-centering" criterion known in the art. Self-centering refers to the capacity of the optical element to roll or slide on the seat 28. It is known to call "self-centered" an optical element that has a friction coefficient with respect to the seat and retaining ring sufficiently small to allow a rolling or a translational movement of the optical element. As for example known from Paul Yoder Jr., "Mounting Optics in Optical Instruments", SPIE Press (2008), the threshold for the friction coefficient can be expressed as:

$$\mu \leq \left| \frac{Y_{c1}}{2R_1} + \frac{Y_{c2}}{2R_{ring}} \right| \qquad (4)$$

Where:
  $\mu$ is the friction coefficient between the optical element and the seat or retaining ring;
  $Y_{c1}$ is the half-diameter of contact of the first surface S1 of the optical element with the seat;
  $Y_{c2}$ is the half-diameter of contact of the second surface S2 of the optical element with the retaining ring;
  $R_1$ is the radius of curvature of the first surface of the optical element, when mounted directly on the seat. For edge mounting of the first surface, $R_1$ is the radius of curvature of the seat; and
  $R_{ring}$ is as above.

It is to be noted that in equation (4) the radius of curvature of $R_1$ of the first surface S1 has a positive value for convex surfaces and a negative value for concave surfaces, wherein the radius of curvature $R_{ring}$ of the equivalent frustro-spherical profile of the retaining ring has a negative value for convex surfaces and a positive value for concave surfaces.

Figure 10A:
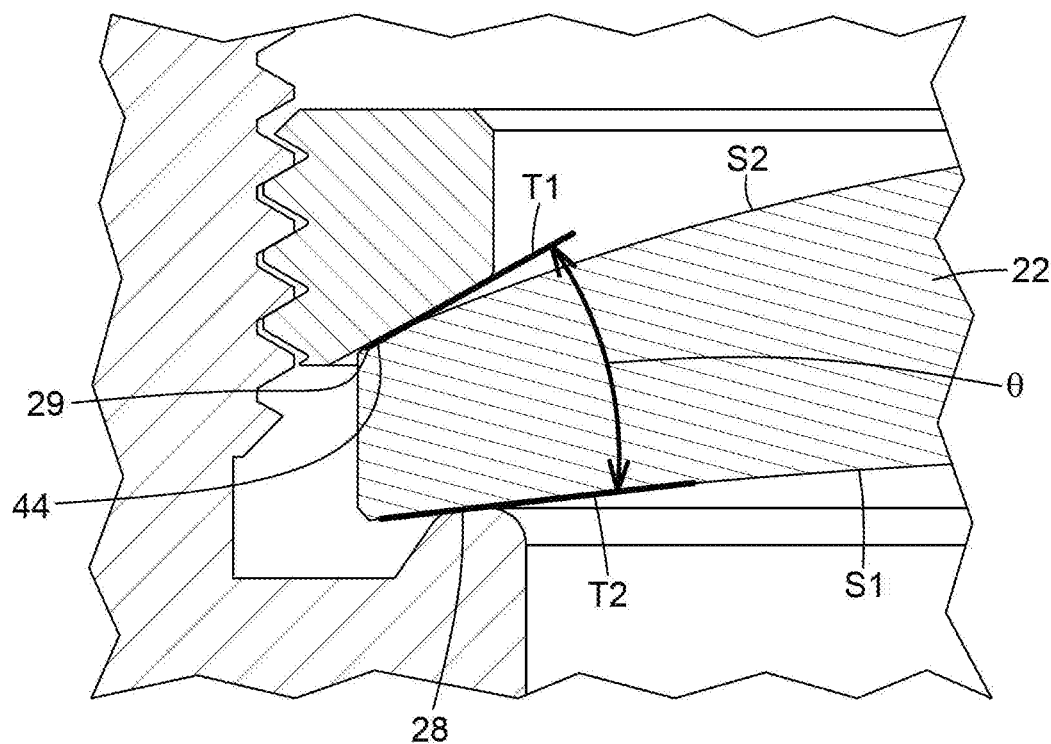
FIG. 10A shows the location of the clamping angle on the edge mounting of an optical element.
Figure 10B:
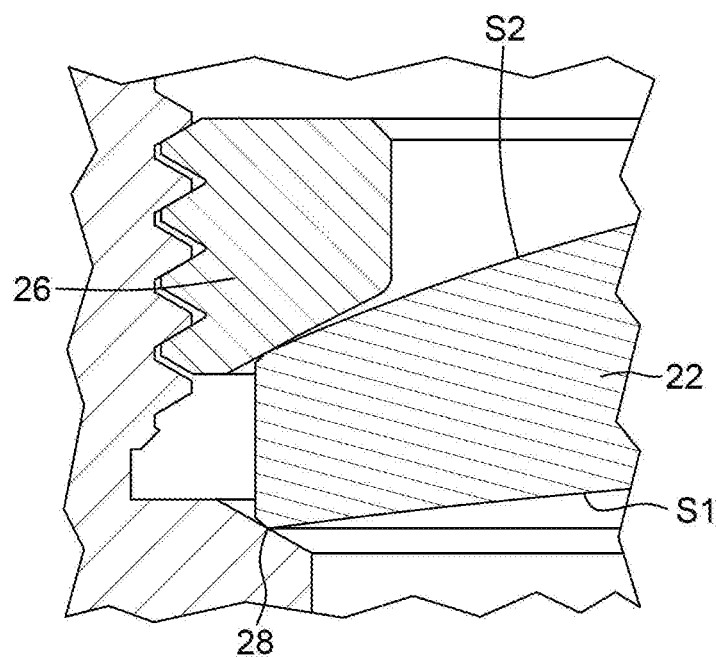
FIG. 10B illustrates a variant where the seat engages the edge of the first surface S1 to enable edge-contact mounting.

With reference to FIG. 10A, the clamping angle θ, defined as the angle between the tangent $T_1$ to the abutment surface 44 at the edge contact line 29 and the tangent $T_2$ to portion of the optical surface S1 resting on the seat 28, is another parameter of interest to the centering of the optical element 22. In some embodiments, to permit the centering of the optical element 22 the clamping angle θ should be large enough to overcome friction and allow the optical element 22 to slide radially when submitted to an axial force. If the optical element is mounted on a concave-shaped seat 28, in some instances the clamping angle θ may be too small to allow the displacement of the optical element 22. In some variants, the thread angle may be adjusted, for example using 90° instead of 60°, to increase the clamping angle θ. In other variants, the seat 28 may be modified to engage the edge of the first surface S1, enabling edge-contact mounting of the second surface S2 for a smaller thread angle, such as for example shown in FIG. 10B.

On average, the centering obtained using the approach described herein can be as precise as the results of the drop-in technique if there was no fabrication error on the diameter of the lens or the internal diameter of the barrel. A comparison can therefore be made with the hypothetical case of no play between the lens and the barrel. The only factor influencing the precision of the obtained centering is the wedge error which could result from the manufacturing of the lens. For typical implementations, a significant improvement of the lens centering compared the drop-in approach is expected. Typical lens wedge expressed in Edge Thickness Difference (ETD) vary from 0.005 mm for high precision tolerance class to 0.05 mm for commercial tolerance class. In addition to this lens wedge error, manufacturing error of the parameters involved in the edge contact mounting equation also affect the final centering of the lens once mounted. Using the following commercial manufacturing tolerances, the lens decenter caused by the manufacturing tolerances other than the lens wedge would be typically within about 5 µm.:

Thread angle tolerance: +/−1 deg
External diameter of the retaining ring: +/−0.1 mm
Diameter of the abutment of the retaining ring: +/−0.1 mm
Radius of curvature of the second surface: +/−1%

Figure 11:
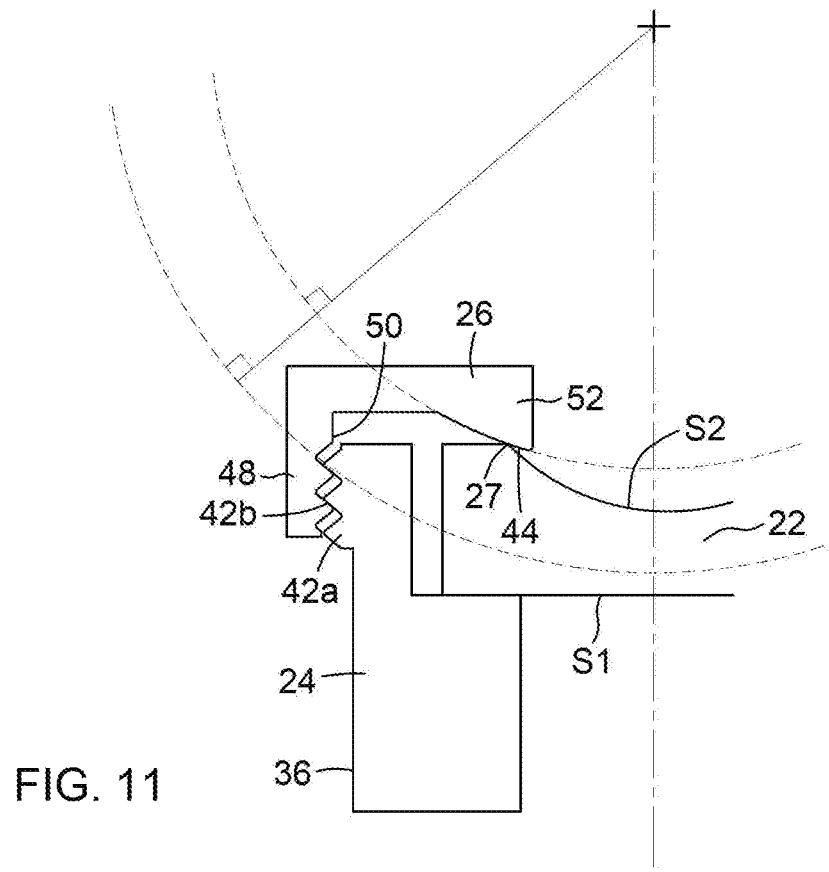
FIGS. 11 and 12 illustrate embodiments using edge mounting to center optical elements having concave surfaces.
Figure 12:
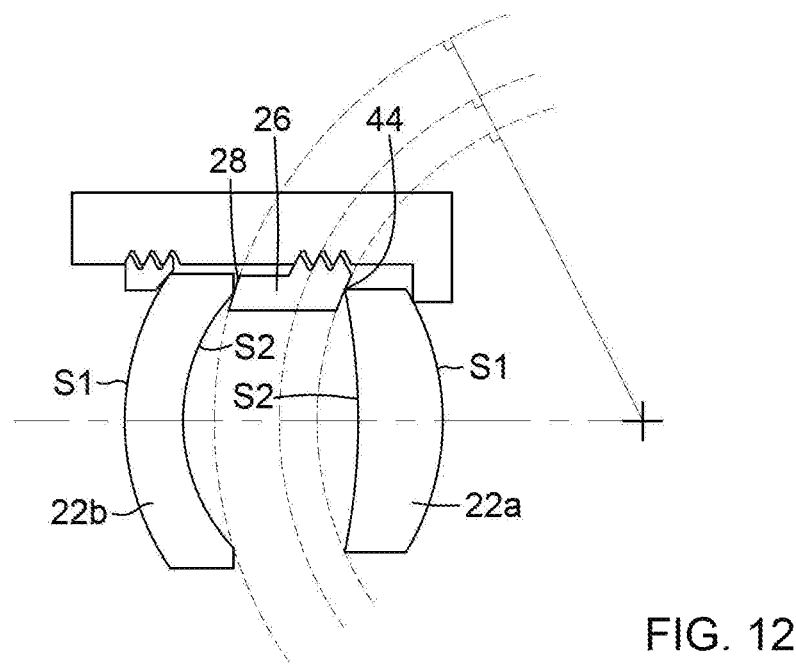

It will be readily understood that other optical assembly configurations can be envisioned. In some examples, the lens or other optical element may be mounted between two retaining rings, where the abutment surface of both rings meets the condition described above. Referring for example to FIGS. 11 and 12, in some embodiments, optical elements 22 having concave surfaces may be centered using the edge mounting principle explained above. In one example, illustrated in FIG. 11, a retaining ring 26 having ring threads 42b facing inwardly and engaging barrel threads 42a facing outwardly may be used to engage a second surface S2 having a concave shape. The retaining ring 26 includes an outer annular segment 48 provided with the inwardly-facing ring threads 42b, the outer annular segment extending outside of the barrel 24. The ring threads 42b are therefore provided on a barrel-facing wall 50 of the outer annular segment 48. The barrel threads 42a are on the outer wall 36 of the barrel 24. The retaining ring 26 further includes an inner annular segment 52, extending inside of the cavity, and including the abutment 44. As can be seen, in the illustrated embodiment the abutment 44 is simply defined by an edge of the inner annular segment 52. In another example, shown in FIG. 12, a first optical element 22a is shown mounted between a seat and a retaining ring 26 having a frustro-spherical abutment surface as explained above, and a second optical element 22b is shown mounted on the surface of the retaining ring 26 opposite the abutment surface 44, which acts as a seat for the first surface S1 of the second optical element. The principles above may be applied to ensure a centering of the second optical element 22b on the seat 28.

In accordance with one aspect, there is provided a method for adapting an optical assembly kit comprising a barrel, an optical element and a retaining ring according to the centering principle described herein. The method includes a step of machining the abutment surface of the ring to have a frustro-spherical profile having a radius of curvature selected in view of the thread angle to maintain a centering of an edge contact line if the retaining ring is decentered in the cavity, or a frustro-conical profile having an inclination angle selected in view of the thread angle to maintain a centering of an edge contact line if the retaining ring is decentered in the cavity.

In some implementations, retaining rings adapted for use in optical assemblies as described above may be provided separately from the other components of the assembly. Since a same retaining ring can be used for mounting optical elements having different radii of curvature, the retaining rings can be versatile enough be usable in a range of assemblies in which the optical element to be secured defines a peripheral mounting edge having a half-diameter Y corresponding to the value used in calculating the radius of curvature of the frustro-spherical profile of the retaining ring, or the inclination angle of the frustro-conical profile of the retaining ring. Advantageously, depending on the required degree of precision on the centering of a particular optical element, a certain amount of deviation of the half-diameter of a centered optical element from the value of Y used in calculating the profile of the abutment surface of the retaining can be tolerated.

By way of example, an interesting application of the edge contact mounting method would be for lens tube systems which are often used in laboratories and for prototype development. The edge mounting makes possible to center lenses having different radii of curvature without having to change the thread angle. The same ring can therefore center lenses of the same diameter having different geometries and different radii of curvature. This means that lens tube systems used in combination with any commercial lenses having diameters of 12.7 mm, 25 mm and 50 mm could be passively and accurately centered using an edge contact mounting ring.

Of course, numerous modifications could be made to the embodiments described above without departing from the scope of the present invention.

The invention claimed is:

1. An optical assembly, comprising:
a barrel having a cavity and a set of barrel threads;
a seat provided in the cavity of the barrel;
an optical element having a first surface resting on the seat and a second surface opposite to the first surface, said optical element having a peripheral mounting edge; and
a retaining ring affixed to the barrel through a set of ring threads complementary to the barrel threads and having a thread angle, the retaining ring comprising an abutment surface engaging the peripheral mounting edge of the optical element along a circular edge contact line, thereby securing the optical element between the seat and the retaining ring, the abutment surface having a frustro-spherical profile having a radius of curvature $R_{Ring}$ given by the formula:

$$R_{Ring} = \sqrt{\left[\frac{d_{ring}}{2\tan(\varphi_{threads}/2)} - h - T/2\right]^2 + Y^2}$$

where:
- $d_{ring}$ is a diameter of the retaining ring along the ring threads;
- $\varphi_{thread}$ is a value of a thread angle;
- Y is a half-diameter of the peripheral mounting edge;
- h is a distance between (i) a first point of contact of the barrel threads with the ring threads proximate to the optical element and (ii) the edge contact line; and
- T is a distance between (i) the first point of contact of the barrel threads with the ring threads proximate to the optical element and (ii) a last point of contact of the barrel threads with the ring threads farthest from the optical element diametrically opposite to the first point of contact.

2. The optical assembly according to claim 1, wherein the peripheral mounting edge is located at a junction of the second surface with a peripheral side wall of the optical element.

3. The optical assembly according to claim 1, wherein the optical element comprises a bevelled surface joining the second surface to a peripheral side wall of the optical element, and the peripheral mounting edge is located at a junction of said bevelled surface with the second surface.

4. The optical assembly according to claim 1, wherein the optical element comprises a bevelled surface joining the second surface to a peripheral side wall of the optical element, and the peripheral mounting edge is located at a junction of said bevelled surface with the peripheral side wall.

5. The optical assembly according to claim 1, wherein the optical element comprises a bevelled surface joining the second surface to a peripheral side wall of the optical element, first and second peripheral mounting edges being defined at respective junctions of said bevelled surface with the peripheral side wall and the second surface, the abutment surface engaging both the first and second peripheral mounting edges.

6. The optical assembly according to claim 1, wherein the seat comprises one of an annular shoulder protruding from an inner wall of the barrel, a rearward facing surface of an additional optical element and an additional retaining ring inserted inside the cavity forward to the optical element.

7. The optical assembly according to claim 1, wherein the optical element comprises:
- a lens, a mirror, a diffractive optical element or a pinhole, having the first surface resting on the seat; and
- a spacer provided in the cavity and located between the retaining ring and said lens, mirror, diffractive optical element or pinhole, the peripheral mounting edge being provided on said spacer.

8. The optical assembly according to claim 1, wherein:
- the second surface of the optical element is concave;
- the barrel threads extend on an outer wall of the barrel;
- the retaining ring comprises an outer annular segment extending outside of the barrel and provided with the ring threads, said ring threads facing towards the barrel, the retaining ring further comprising an inner annular segment extending inside of the cavity and including the abutment surface.

9. An optical assembly, comprising:
- a barrel having a cavity and a set of barrel threads, the cavity having a longitudinal center axis;
- a seat provided in the cavity of the barrel;
- an optical element having first surface resting on the seat and a second surface opposite the first surface, said optical element having a peripheral mounting edge along the second surface; and
- a retaining ring affixed to the barrel through a set of ring threads complementary to the barrel threads and having a thread angle, the retaining ring comprising an abutment surface engaging the peripheral mounting edge of the optical element along a circular edge contact line or band, thereby securing the optical element between the seat and the retaining ring, the abutment surface having a frustro-conical profile having an inclination angle α with respect to a plane perpendicular to the longitudinal center axis of the cavity given by the formula:

$$\alpha = \sin^{-1}\left(\frac{Y}{\sqrt{\left[\frac{d_{ring}}{2\tan(\varphi_{threads}/2)} - h - T/2\right]^2 + Y^2}}\right)$$

where:
- Y is a half-diameter of the peripheral mounting edge;
- $d_{ring}$ is a diameter of the retaining ring along the ring threads;
- $\varphi_{thread}$ is a value of a thread angle;
- h is a distance between (i) a first point of contact of the barrel threads with the ring threads proximate to the optical element and (ii) the edge contact line; and
- T is a distance between (i) the first point of contact of the barrel threads with the ring threads proximate to the optical element and (ii) a last point of contact of the barrel threads with the ring threads farthest from the optical element diametrically opposite to the first point of contact.

10. The optical assembly according to claim 9, wherein the peripheral mounting edge is located at a junction of the second surface with the peripheral side wall.

11. The optical assembly according to claim 9, wherein the optical element comprises a bevelled surface joining the second surface to the peripheral side wall, and the peripheral mounting edge is located at a junction of said bevelled surface with the second surface.

12. The optical assembly according to claim 9, wherein the optical element comprises a bevelled surface joining the second surface to the peripheral side wall, and the peripheral mounting edge is located at a junction of said bevelled surface with the peripheral side wall.

13. The optical assembly according to claim 9, wherein the optical element comprises a bevelled surface joining the second surface to a peripheral side wall of the optical element, the bevelled surface defining said peripheral mounting edge, said bevelled surface having a same inclination angle α as the frustro-conical profile with respect to a plane perpendicular to the longitudinal center axis.

14. The optical assembly according to claim 9, wherein the seat comprises one of an annular shoulder protruding from an inner wall of the barrel, a rearward facing surface of an additional optical element, and an additional retaining ring inserted inside the cavity forward to the optical element.

15. The optical assembly according to claim 9, wherein the optical element comprises:
- a lens, a mirror, a diffractive optical element or a pinhole having a surface defining the first surface resting on the seat; and
- a spacer provided in the cavity between the retaining ring and said lens, mirror, diffractive optical element or pinhole, the peripheral mounting edge being provided on said spacer.

16. The optical assembly according to claim 9, wherein:
the second surface of the optical element is concave;
the barrel threads extend on an outer wall of the barrel;
the retaining ring comprises an outer annular segment extending outside of the barrel and provided with the ring threads, said ring threads facing towards the barrel, the retaining ring further comprising an inner annular segment extending inside of the cavity and including the abutment surface.

17. A retaining ring for securing an optical element in a cavity of a barrel provided with barrel threads and a seat, the optical element having a peripheral mounting edge having a half-diameter Y, the retaining ring comprising:
a set of ring threads engageable with the barrel threads to affix the retaining ring to the barrel, the ring threads having a thread angle; and
an abutment surface engageable with the peripheral mounting edge of the optical element along a circular edge contact line, thereby securing the optical element between the seat and the retaining ring, the abutment surface having a frustro-spherical profile having a radius of curvature $R_{Ring}$ given by the formula:

$$R_{Ring} = \sqrt{\left[\frac{d_{ring}}{2\tan(\varphi_{threads}/2)} - h - T/2\right]^2 + Y^2}$$

where:
$d_{ring}$ is a diameter of the retaining ring along the ring threads;
$\varphi_{thread}$ is a value of a thread angle;
h is a distance between (i) a first point of contact of the barrel threads with the ring threads proximate to the optical element and (ii) the edge contact line; and
T is a distance between (i) the first point of contact of the barrel threads with the ring threads proximate to the optical element and (ii) a last point of contact of the barrel threads with the ring threads farthest from the optical element diametrically opposite to the first point of contact.

18. The retaining ring according to claim 17, wherein the ring threads are disposed along an outer perimeter of the retaining ring such that the retaining ring can be screwed inside the cavity.

19. The retaining ring according to claim 17, comprising:
an outer annular segment configured to extend outside of the barrel and having a barrel-facing wall provided with the ring threads; and
an inner annular segment configured to extend inside of the cavity and including the abutment surface.

20. A retaining ring for securing an optical element in a cavity of a barrel provided with barrel threads and a seat, the optical element having a peripheral mounting edge having a half-diameter Y, the cavity having a longitudinal center axis, the retaining ring comprising:
a set of ring threads engageable with the barrel threads to affix the retaining ring to the barrel, the ring threads having a thread angle; and
an abutment surface engageable with the peripheral mounting edge of the optical element along a circular edge contact line, thereby securing the optical element between the seat and the retaining ring, the abutment surface having a frustro-conical profile having an inclination angle α with respect to a plane perpendicular to the longitudinal center axis of the cavity given by the formula:

$$\alpha = \sin^{-1}\left(\frac{Y}{\sqrt{\left[\frac{d_{ring}}{2\tan(\varphi_{threads}/2)} - h - T/2\right]^2 + Y^2}}\right)$$

where:
$d_{ring}$ is a diameter of the retaining ring along the ring threads;
$\varphi_{thread}$ is a value of a thread angle;
h is a distance between (i) a first point of contact of the barrel threads with the ring threads proximate to the optical element and (ii) the edge contact line; and
T is a distance between (i) the first point of contact of the barrel threads with the ring threads proximate to the optical element and (ii) a last point of contact of the barrel threads with the ring threads farthest from the optical element diametrically opposite to the first point of contact.

21. The retaining ring according to claim 20, wherein the ring threads are disposed along an outer perimeter of the retaining ring such that the retaining ring can be screwed inside the cavity.

22. The retaining ring according to claim 20, comprising:
an outer annular segment configured to extend outside of the barrel and having a barrel-facing wall provided with the ring threads; and
an inner annular segment configured to extend inside of the cavity and including the abutment surface.

* * * * *